(12) United States Patent
Shishido et al.

(10) Patent No.: US 9,740,982 B2
(45) Date of Patent: Aug. 22, 2017

(54) ITEM SELECTING APPARATUS, ITEM SELECTING METHOD AND ITEM SELECTING PROGRAM

(71) Applicant: JVC KENWOOD CORPORATION, Yokohama-shi, Kanagawa (JP)

(72) Inventors: Ichiro Shishido, Zushi (JP); Konosuke Matsushita, Kawasaki (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 146 days.

(21) Appl. No.: 14/599,845

(22) Filed: Jan. 19, 2015

(65) Prior Publication Data
US 2015/0170041 A1    Jun. 18, 2015

Related U.S. Application Data

(63) Continuation of application No. 13/642,024, filed as application No. PCT/JP2011/059866 on Apr. 21, 2011, now Pat. No. 8,972,419.

(30) Foreign Application Priority Data

Apr. 28, 2010  (JP) ................................. 2010-103230

(51) Int. Cl.
*G06F 17/30*    (2006.01)
*G06Q 30/00*    (2012.01)
(Continued)

(52) U.S. Cl.
CPC .......... *G06N 5/04* (2013.01); *G06F 17/30752* (2013.01); *G06Q 30/00* (2013.01); *G06Q 30/02* (2013.01)

(58) Field of Classification Search
CPC .......... G06N 5/04; G06Q 30/02; G06Q 30/00; G06F 17/30752; G06F 17/3053; G06F 17/30867
(Continued)

(56) References Cited

U.S. PATENT DOCUMENTS 5,754,938 A * 5/1998 Herz .................... G06Q 20/383
                                                      348/E7.056
6,029,195 A * 2/2000 Herz ................. G06F 17/30867
                                                      348/E7.056
(Continued)

FOREIGN PATENT DOCUMENTS

CN      1203399 A      12/1998
CN   101105795 A       1/2008
(Continued)

OTHER PUBLICATIONS

Castells et al., "Novelty and Diversity Metrics for Recommender Systems: Choice, Discovery and Relevance", In the Proceedings of the International Workshop on Diversity in Document Retrieval (DDR 2011), ACM Press, New York, 2011, 8 pages.*
(Continued)

*Primary Examiner* — Phuong Thao Cao
(74) *Attorney, Agent, or Firm* — Nath, Goldberg & Meyer; Jerald L. Meyer

(57) ABSTRACT

In an item selecting apparatus performing a selection of an item to be recommended for each user, it is performed to calculate, with respect to each usage registration of an item by a user, an elapsed value as a difference between a time point of creating the item or staring providing of the item and a predetermined time point, acquire a usage characteristics of each user based on the elapsed value and calculate a freshness value representing a degree of freshness about each item. Further, using correspondence rules of different characteristics corresponding to the usage characteristics, it
(Continued)

is performed to calculate a novelty index by applying the freshness value of each item on the correspondence rule corresponding to the usage characteristics of each user, calculate a priority of the item for each user, based on the novelty index and performing a selection of the item.

16 Claims, 18 Drawing Sheets

(51) Int. Cl.
*G06Q 30/02* (2012.01)
*G06N 5/04* (2006.01)

(58) Field of Classification Search
USPC ................................................ 707/751
See application file for complete search history.

(56) References Cited

U.S. PATENT DOCUMENTS

| | | | |
|---|---|---|---|
| 6,041,311 A * | 3/2000 | Chislenko | G06F 17/30699 705/26.7 |
| 6,049,777 A * | 4/2000 | Sheena | G06F 17/30699 705/26.2 |
| 6,982,640 B2 * | 1/2006 | Lindsay | G06K 19/0717 340/10.1 |
| 7,209,906 B2 | 4/2007 | Goodwin et al. | |
| 7,240,027 B2 | 7/2007 | McConnell et al. | |
| 7,454,698 B2 | 11/2008 | Kohda et al. | |
| 7,529,639 B2 | 5/2009 | Rasanen et al. | |
| 7,568,148 B1 | 7/2009 | Bharat et al. | |
| 7,599,554 B2 | 10/2009 | Agnihotri et al. | |
| 7,660,581 B2 | 2/2010 | Ramer et al. | |
| 7,756,880 B2 * | 7/2010 | Sighart | G06F 17/30867 707/751 |
| 7,865,187 B2 | 1/2011 | Ramer et al. | |
| 8,117,211 B2 * | 2/2012 | Yamamoto | G06F 17/30867 707/749 |
| 8,166,052 B2 * | 4/2012 | Song | G06K 9/6222 707/751 |
| 8,171,035 B2 * | 5/2012 | Song | G06K 9/6221 707/751 |
| 8,180,778 B1 | 5/2012 | Pedersen et al. | |
| 8,452,797 B1 * | 5/2013 | Paleja | G06Q 30/02 707/767 |
| 8,468,164 B1 * | 6/2013 | Paleja | G06F 17/30867 707/767 |
| 8,478,185 B2 | 7/2013 | Capone et al. | |
| 8,478,759 B2 | 7/2013 | Akiyama et al. | |
| 8,498,992 B2 | 7/2013 | Shishido et al. | |
| 8,566,332 B2 | 10/2013 | Huberman et al. | |
| 8,589,378 B2 * | 11/2013 | Liu | G06F 17/30699 707/708 |
| 8,639,569 B2 | 1/2014 | Matsushita et al. | |
| 8,745,617 B1 * | 6/2014 | Stekkelpak | G06F 9/44505 717/173 |
| 8,914,399 B1 * | 12/2014 | Paleja | G06F 17/30867 705/26.61 |
| 9,075,882 B1 * | 7/2015 | Ward | G06F 17/30867 |
| 2002/0099629 A1 | 7/2002 | Sato et al. | |
| 2003/0050863 A1 * | 3/2003 | Radwin | G06Q 30/02 705/26.1 |
| 2003/0065583 A1 | 4/2003 | Takaoka | |
| 2004/0044677 A1 | 3/2004 | Huper-Graff et al. | |
| 2004/0260589 A1 | 12/2004 | Varadarajan et al. | |
| 2006/0036597 A1 | 2/2006 | Kobayashi | |
| 2006/0080321 A1 | 4/2006 | Horn et al. | |
| 2006/0210157 A1 | 9/2006 | Agnihotri et al. | |
| 2006/0265332 A1 | 11/2006 | Goffinet et al. | |
| 2007/0060099 A1 | 3/2007 | Ramer et al. | |
| 2007/0156676 A1 | 7/2007 | Rosenberg | |
| 2007/0226261 A1 * | 9/2007 | Urita | G06F 3/0482 |
| 2008/0195945 A1 | 8/2008 | Vaughan et al. | |
| 2008/0229351 A1 | 9/2008 | Torimaru | |
| 2009/0006371 A1 * | 1/2009 | Denoue | G06F 17/30867 |
| 2009/0077132 A1 | 3/2009 | Yamamoto et al. | |
| 2009/0092142 A1 * | 4/2009 | Kreiner | H04L 45/306 370/401 |
| 2009/0158170 A1 * | 6/2009 | Narayanan | H04L 67/38 715/753 |
| 2009/0164897 A1 * | 6/2009 | Amer-Yahia | G06F 3/00 715/703 |
| 2009/0204581 A1 * | 8/2009 | Lim | G06F 17/30867 |
| 2010/0030713 A1 * | 2/2010 | Simpson | G06F 17/30702 706/11 |
| 2010/0082575 A1 * | 4/2010 | Walker | G06F 17/30038 707/706 |
| 2010/0115050 A1 * | 5/2010 | Sultenfuss | H04L 69/28 709/217 |
| 2010/0180203 A1 | 7/2010 | Tokita et al. | |
| 2010/0198773 A1 * | 8/2010 | Wallisch | G06Q 30/02 706/54 |
| 2010/0223578 A1 * | 9/2010 | Huberman | G06Q 99/00 715/810 |
| 2010/0238943 A1 | 9/2010 | Hirayama | |
| 2010/0250341 A1 * | 9/2010 | Hauser | G06F 17/30867 707/769 |
| 2010/0281012 A1 | 11/2010 | Imig et al. | |
| 2011/0004507 A1 * | 1/2011 | Potkonjak | G06Q 10/06375 705/7.37 |
| 2011/0078323 A1 | 3/2011 | Wooden | |
| 2011/0246440 A1 * | 10/2011 | Kocks | G06F 17/30781 707/706 |
| 2011/0320276 A1 | 12/2011 | Ray et al. | |
| 2012/0078683 A1 * | 3/2012 | Mendiratta | G06Q 30/0201 705/7.29 |
| 2012/0101890 A1 | 4/2012 | Matsushita et al. | |
| 2012/0130848 A1 | 5/2012 | Shishido et al. | |
| 2012/0131018 A1 | 5/2012 | Shishido et al. | |
| 2012/0151440 A1 | 6/2012 | Sakairi et al. | |
| 2012/0158527 A1 * | 6/2012 | Cannelongo | G06Q 30/02 705/14.73 |
| 2012/0239752 A1 * | 9/2012 | Gopinath | G06Q 30/02 709/204 |
| 2013/0031104 A1 * | 1/2013 | Gopinath | G06F 17/30867 707/748 |
| 2013/0046766 A1 * | 2/2013 | Shishido | G06F 17/30752 707/741 |
| 2013/0124317 A1 | 5/2013 | Ramer et al. | |
| 2013/0191373 A1 * | 7/2013 | Kaul | G06F 17/30522 707/722 |
| 2013/0238748 A1 | 9/2013 | Sakahira et al. | |
| 2013/0254308 A1 | 9/2013 | Rose et al. | |

FOREIGN PATENT DOCUMENTS

| | | | |
|---|---|---|---|
| EP | 1 835 419 A1 | 9/2007 | |
| JP | 2000-112972 | * 4/2000 | ............ G06F 17/30 |
| JP | 2000-112972 | 4/2000 | |
| JP | 2001-167101 A | 6/2001 | |
| JP | 2004213836 A | 7/2004 | |
| JP | 2004-326227 A | 11/2004 | |
| JP | 2007324874 A | 12/2007 | |
| JP | 2008-009729 A | 1/2008 | |
| JP | 2009-273043 A | 11/2009 | |

OTHER PUBLICATIONS

Lee et al., "Dynamic Item Recommendation by Topic Modeling for Social Networks", In Proceedings of Eighth International Conference on Information Technology: New Generations, ser. ITNG, 2011, Nevada, USA, 6 pages.*

Mobasher et al., "Automatic Personalization Based on Web Usage Mining", Magazine: Communication of the ACM, vol. 43, Issue 8, Aug. 2000, pp. 142-151.*

Parsons et al., "Using Viewing Time to Infer User Preference in Recommender Systems", AAAI Workshop in Semantic Web Personalization, San Jose, California, Jul. 2004, 12 pages.*

(56) References Cited

OTHER PUBLICATIONS

Zhang et al., "Personalized Recommendation via Integrated Diffusion on User-Item-Tag Tripartite Graphs", 2009, 12 pages, available at <https://arxiv.org/ftp/arxiv/papers/0904/0904.1989.pdf>.*
Dogan et al., "Understanding PubMed User Search Behavior Through Log Analysis", Database, vol. 2009, 18 pages, 2009.*
Official Action issued Dec. 29, 2014 corresponding to application No. 201180021611.9.
Office Action issued on Dec. 17, 2013 in the counterpart Japanese application.
Office Communication issued in European application No. EP 11 774 911.9 dated Apr. 30, 2015 (Apr. 30, 2015).

* cited by examiner

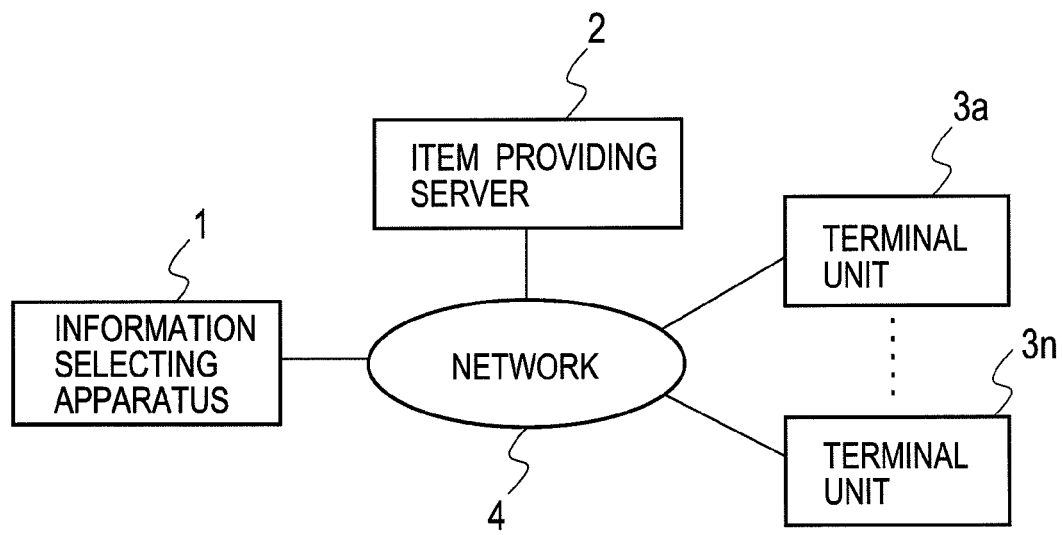
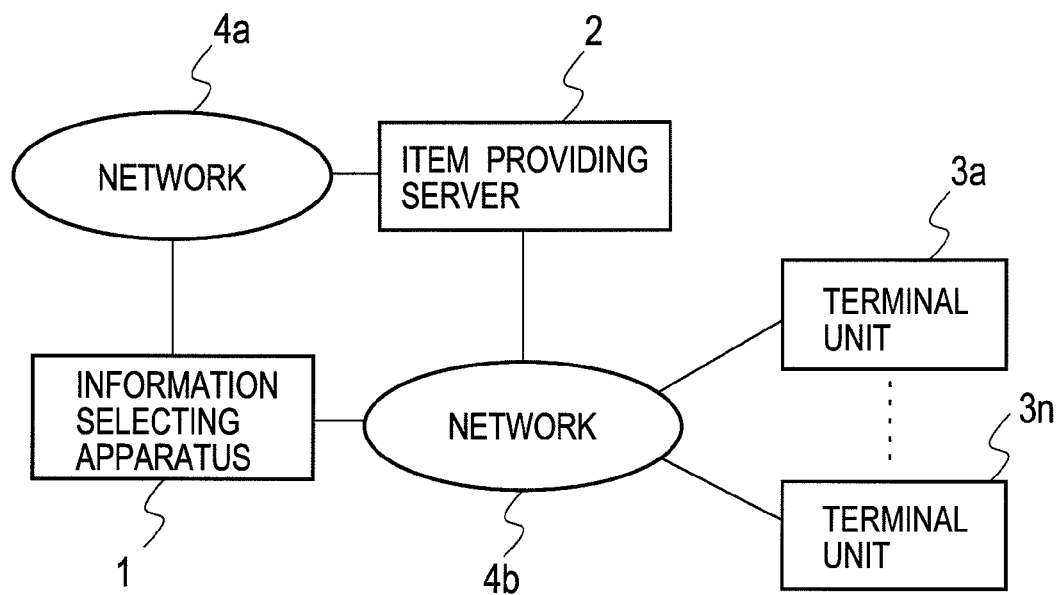

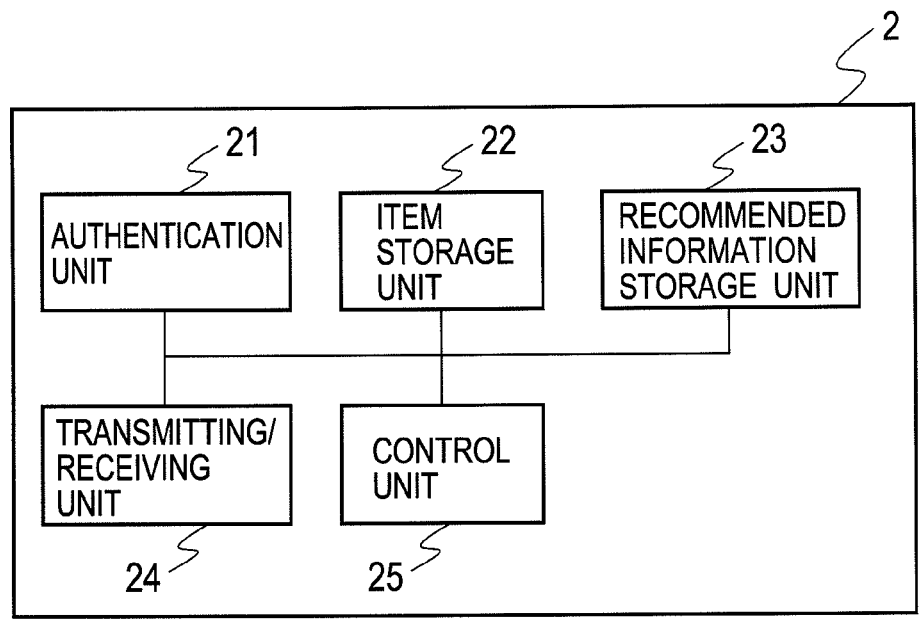

FIG. 5

| USER IDENTIFIER | ITEM IDENTIFIER | RECOMMENDATION ORDER |
|---|---|---|
| UserID-1 | ItemID-1000 | 1 |
| UserID-1 | ItemID-1020 | 2 |
| UserID-1 | ItemID-1035 | 3 |
| …… | …… | …… |
| UserID-1 | ItemID-2008 | N1 |
| UserID-2 | ItemID-1000 | 1 |
| UserID-2 | ItemID-2005 | 2 |
| …… | …… | …… |
| UserID-2 | ItemID-2000 | N2 |
| UserID-3 | ItemID-3000 | 1 |
| …… | …… | …… |

FIG. 10A

| ITEM IDENTIFIER | ITEM TIME INFO. |
|---|---|
| ItemID-1 | 2009/12/30 |
| ItemID-2 | 2009/12/28 |
| ItemID-3 | 2009/12/31 |
| ...... | ...... |
| ItemID-N | Date-N |

FIG. 10B

| ITEM IDENTIFIER | ITEM TIME INFO. | ITEM PROPERTY INFO. | | | | |
|---|---|---|---|---|---|---|
| | | TITLE | CREATOR | CATEGORY | DESCRIPTION | ...... |
| ItemID-1 | 2009/12/30 | | | | | |
| ItemID-2 | 2009/12/28 | | | | | |
| ItemID-3 | 2009/12/31 | | | | | |
| ...... | ...... | | | | | |
| ItemID-N | Date-N | | | | | |

FIG. 11

| USER IDENTIFIER | ITEM IDENTIFIER | USAGE TIME INFO. |
|---|---|---|
| UserID-1 | ItemID-3 | 2010/01/01 10:15:20 |
| UserID-1 | ItemID-24 | 2010/01/02 15:20:30 |
| UserID-3 | ItemID-30 | 2010/01/03 13:05:40 |
| UserID-1 | ItemID-5 | 2010/01/05 16:30:40 |
| UserID-3 | ItemID-3 | 2010/01/07 20:00:30 |
| ...... | ...... | ...... |

| ITEM | POPULARITY INDEX |
|---|---|
| ITEM A | 50 |
| ITEM B | 45 |
| ITEM C | 30 |

|  | g1(x) | g2(x) | g3(x) | g4(x) |
|---|---|---|---|---|
| POINT A | 0.2 | 0.7 | 1.0 | 1.5 |
| POINT B | 0.7 | 1.0 | 1.0 | 1.0 |
| POINT C | 1.7 | 1.4 | 1.0 | 0.8 |

|  | USER 1 | USER 2 | USER 3 | USER 4 |
|---|---|---|---|---|
| ITEM A | 10.0 | 35.0 | 50.0 | 75.0 |
| ITEM B | 31.5 | 45.0 | 45.0 | 45.0 |
| ITEM C | 51.0 | 42.0 | 30.0 | 24.0 |

| USER IDENTIFIER OF TARGET USER FOR RECOMMENDATION | USER IDENTIFIER OF SIMILAR USER | SIMILARITY |
|---|---|---|
| UserID-1 | UserID-100 | 0.95 |
| UserID-1 | UserID-80 | 0.9 |
| ..... | ..... | ..... |
| UserID-1 | UserID-105 | 0.6 |
| UserID-2 | UserID-105 | 0.85 |
| UserID-2 | UserID-70 | 0.82 |
| ..... | ..... | ..... |
| UserID-2 | UserID-3 | 0.6 |
| UserID-3 | UserID-2 | 0.6 |
| UserID-4 | UserID-70 | 0.8 |
| ..... | ..... | ..... |
| UserID-Us | ..... | ..... |

FIG. 26A

| USER IDENTIFIER | NAME | SEXUALITY | DATE OF BIRTH | REGION | TYPE OF BLOOD | ADMISSION DATE | HOBBY | FAVORITE CATEGORY 1 | FAVORITE CATEGORY 2 | FAVORITE KEYWORD |
|---|---|---|---|---|---|---|---|---|---|---|
| | | | | | | USER PROPERTY INFO. (PERSONAL PROPERTY) | | | | |
| UID-1 | ×× | MALE | 1970/01/01 | TOKYO | A | 2007/3 | BASEBALL | JAZZ | ROCK | ◇◇ |
| UID-2 | ○○ | FEMALE | 1976/03/09 | CHIBA | – | 2009/4 | FLOWER ARRANGEMENT | CLASSICS | J-POP | ◆◇ |
| UID-3 | △△ | FEMALE | 1964/10/10 | OSAKA | O | 2008/9 | GOLF | ROCK | | ■■ |
| ⋮ | ⋮ | ⋮ | ⋮ | ⋮ | ⋮ | ⋮ | ⋮ | ⋮ | ⋮ | ⋮ |
| UID-Ug | ◆◆ | MALE | 1985/04/01 | NAGANO | B | 2010/1 | MOVIE | TECHNO-POP | – | – |

FIG. 26B

| USER IDENTIFIER | USER PROPERTY INFO. (PERSONAL PROPERTY) ||| USER PROPERTY INFO. (OTHER PERSON PROPERTY) |||||||
|---|---|---|---|---|---|---|---|---|---|
| | NAME | SEXUALITY | ... | FAVORITE KEYWORD | AGE GROUP | SEXUALITY | TYPE OF BLOOD | HOBBY 1 | HOBBY 2 | FAVORITE CATEGORY 1 | FAVORITE CATEGORY 2 |
| UID-1 | ×× | MALE | ... | ◇◇ | 25–30 | FEMALE | — | SPORTS | DRIVING | JAZZ | CLASSICS |
| UID-2 | ○○ | FEMALE | ... | ◆◇ | 20–30 | FEMALE | O | TEA CEREMONY | MUSIC | CLASSICS | — |
| UID-3 | △△ | FEMALE | ... | ■■ | 30–40 | MALE | A | GOLF | ART APPRECIATION | ROCK | — |
| ⋮ | ⋮ | ⋮ | ⋮ | ⋮ | ⋮ | ⋮ | ⋮ | ⋮ | ⋮ | ⋮ | ⋮ |
| UID-Ug | ◆ | MALE | ... | — | 20–25 | FEMALE | O | — | — | TECHNO-POP | — |

US 9,740,982 B2

ITEM SELECTING APPARATUS, ITEM SELECTING METHOD AND ITEM SELECTING PROGRAM

This is a Continuation Application of U.S. patent application Ser. No. 13/642,024, filed Oct. 18, 2012, now U.S. Pat. No. 8,972,419, which is a national stage entry of International Application No. PCT/JP2011/059866, filed Apr. 21, 2011, which claims the benefit from Japanese Application No. 2010-103230, filed Apr. 28, 2010, the contents of each of which are hereby incorporated by reference in their entirety.

TECHNICAL FIELD

The present invention relates to an item selecting apparatus, item selecting method and item selecting program for selecting an appropriate item suitable for a user on the ground of user's usage information about items.

BACKGROUND ART

With developments of digital technology and network technology, delivering or selling various items, such as contents and articles, through a network has been rising in recent years. Correspondingly, there are growing needs for technology of providing a user with information about an item on user's desire selected from a number of items. There is disclosed a technology of providing a user with information about items corresponding to user's tastes or interests by user's evaluation information or usage information about items.

Meanwhile, there are great differences between individuals in the continuousness of user's interests against items, rapidity of change in user's tastes and so on, depending on users. Therefore, it is difficult to select and provide appropriate items for a wide range of users. For measures against such a problem, for example, there is disclosed a method of allowing parameters of learning period, recommendation period and numbers of similar users to be established each user thereby recommending contents suitable for the user, in Patent Document No. 1.

PRIOR ART DOCUMENT

Patent Document

Patent Document 1: Japanese Patent Publication Laid-open No. 2004-326227

SUMMARY OF THE INVENTION

Problem to be Solved

According to the method disclosed in Patent Document No. 1, as parameters of "learning period", "recommendation period" and "number of similar users" are set for each user, it is expected that the method enables appropriate contents to be recommended despite of great differences in the change rate of users' tastes between individual users, in comparison with the normal method where such parameters are fixed throughout all users.

In Patent Document No. 1, however, a person (e.g. a user, a service operator, etc.) has to input parameters used for such a recommendation process, in a complex operation. Generally speaking, a user does not have the knowledge of complicated information processing, such as recommendation process, it is difficult for a user himself (or herself) to set the parameters to appropriate values. Even in a case where a service operator sets the parameters, it is difficult to set the parameters for appropriate values because the operation of inputting parameters of many users is troublesome and the validity of a final recommendation result has to entrust its judgment to only the user himself (or herself). In addition, the human-intensive setting of parameters has a tendency that once the parameters are established in values, they are no longer updated subsequently. Thus, even if the accuracy of recommendation is appropriate immediately after setting the parameters, the accuracy of recommendation is gradually reduced since the values of the parameters cannot follow user's changes in the utilization pattern of items.

Therefore, an object of the present invention is to select an item to a wide array of users with accuracy and without urging a user or a service operator to go to trouble in setting parameters for the information selecting operation.

Solutions to the Problems

In order to attain the above object, an item selecting apparatus (1, 1b, 1c) of a first aspect of the invention comprises: an item property storage unit (10) configured to store an item identifier of each item and item time information representing a time point of creating the item or a time point of starting providing of the item, in an associated manner; a receiving unit (14) configured to receive usage information from another apparatus (2), the usage information including a use subject identifier for identifying either a user or a terminal unit that the user has used and an item identifier for identifying an item used by the user; a usage history storage unit (11) configured to store a usage history which associates the use subject identifier with the item identifier contained in the usage information received by the receiving unit; a usage characteristics information calculating unit (12) configured to calculate an elapsed value as a difference between the item time information corresponding to the item identifier contained in the usage history stored in the usage history storage unit and a given time point and calculate usage characteristics information with respect to each use subject identifier contained in the usage history stored in the usage history storage unit, based on a distribution of the elapsed values corresponding to the use subject identifier; and an item selecting unit (13) configured to: calculate, with respect to each item identifier stored in the item property storage unit, a freshness value representing a degree of freshness of the item related to the item identifier, based on the item time information corresponding to the item identifier; calculate a novelty index by using correspondence rules with different characteristics corresponding to the usage characteristics information and further applying the freshness value on the correspondence rule of them corresponding to the usage characteristics information of each use subject identifier; calculate a priority of the item each use subject identifier, based on the novelty index; and perform a selection of the item each use subject identifier, based on the priority. Note that numerals in parentheses designate numerals of corresponding elements in the figures, respectively.

An item selecting apparatus (1) of a second aspect comprises: a receiving unit (14) configured to receive usage information from another apparatus (2), the usage information including at least an use subject identifier for identifying either a user or a terminal unit that the user has used and an item identifier for identifying an item used by the user; a usage history storage unit (11) configured to store either a usage history associating three information contained in the usage information received by the receiving unit with each other, the three information comprising the use subject identifier, the item identifier and usage time information representing a time point when the item was used, or another usage history associating two information contained in the usage information received by the receiving unit and usage time information representing a time point when the receiving unit received the usage information with each other, the two information comprising the use subject identifier and the item identifier; a usage characteristics information calculating unit (12) configured to calculate an elapsed value as a difference between the usage time information contained in the usage history stored in the usage history storage unit and a given time point and calculate usage characteristics information, with respect to each use subject identifier contained in the usage history stored in the usage history storage unit, based on a distribution of the elapsed values corresponding to the use subject identifier; and an item selecting unit (13) configured to: calculate, with respect to each item identifier stored in the item property storage unit, a freshness value representing a degree of freshness of the item related to the item identifier, based on the usage time information corresponding to the item identifier; calculate a novelty index by using correspondence rules with different characteristics corresponding to the usage characteristics information and further apply the freshness value on the correspondence rule of them corresponding to the usage characteristics information of each use subject identifier; calculate a priority of the item each use subject identifier, based on the novelty index; and perform a selection of the item each use subject identifier, based on the priority.

An item selecting apparatus of a third aspect of the invention is characterized in that, in the item selecting apparatus of the first aspect, the usage history storage unit stores either a usage history associating three information contained in the usage information received by the receiving unit with each other, the three information comprising the use subject identifier, the item identifier and usage time information representing a time point when the item was used, or another usage history associating two information contained in the usage information received by the receiving unit and usage time information representing a time point when the receiving unit received the usage information with each other, the two information comprising the use subject identifier and the item identifier, and the usage characteristics information calculating unit adopts the usage time information contained in the usage history as the given time point, in calculating the elapsed values about the usage history stored in the usage history storage unit.

An item selecting apparatus of a fourth aspect of the invention is characterized in that, in the item selecting apparatus of the second aspect, the usage characteristics information calculating unit calculates estimated item time information as an estimate value for a time point of creating the item or starting providing of the item related to the item identifier by using a distribution of the usage time information of respective usage histories containing the item identifier of the usage history, and adopts the estimated item time information as the given time point, in calculating the elapsed value about the usage history stored in the usage history storage unit.

An item selecting apparatus of a fifth aspect of the invention is characterized in that, in the item selecting apparatus of the second aspect, the usage characteristics information calculating unit adopts, as the given time point, the usage time information contained in the other usage history which contains an use subject identifier identical to the use subject identifier contained in the usage history and which temporally-neighbors the usage history, in calculating the elapsed value about the usage history stored in the usage history storage unit.

An item selecting apparatus of a sixth aspect of the invention is characterized in that, in the item selecting apparatus of the fifth aspect, the apparatus further comprises an item property storage unit (10) configured to store an item identifier of each item and item time information representing a time point of creating the item or a time point of starting providing of the item, in an associated manner, and the item selecting unit calculates the freshness value based on the item time information stored in the item property storage unit, in place of the usage time information.

An item selecting apparatus of a seventh aspect of the invention is characterized in that, in the item selecting apparatus of the first or the sixth aspect, the item property storage unit stores category information representing a category where the item belongs to, in a further-associated manner with the item identifier and the item time information, in storing the item identifier of the item and the item time information in the associated manner, and the item selecting unit selects an item related to the item identifier corresponding to the category information satisfying a predetermined condition, in performing a selection of the item with respect to each use subject identifier based on the priority.

An item selecting apparatus of an eighth aspect of the invention is characterized in that, in the item selecting apparatus of any one of the first to the seventh aspects, the item selecting unit calculates a popularity index as a numerical value related to either the number of use times with respect to each item or the number of use users with respect to each item, based on the usage history stored in the usage history storage unit (S410, S740, S830), and performs calculations of the priority by using the popularity index.

An item selecting apparatus of a ninth aspect of the invention is characterized in that, in the item selecting apparatus of any one of the first to the seventh aspects, the usage information received from the other apparatus contains an evaluated value representing an evaluation level of a user related to the usage information against an item related to the usage information, the usage history stored based on the usage information received by the receiving unit is associated with the evaluated value contained in the usage information, and the item selecting unit calculates a popularity index by using a value obtained by adding the evaluated value with respect to each item, based on the usage history stored in the usage history storage unit, and performs calculations of the priority by using the popularity index.

An item selecting apparatus of a tenth aspect of the invention is characterized in that, in the item selecting apparatus of any one of the first to the ninth aspects, the usage characteristics information calculating unit calculates a representative value based on the distribution of the elapsed values, as a constituent of the usage characteristic information, in calculating, with respect to each use subject identifier, the usage characteristics information based on the distribution of elapsed values corresponding to the use subject identifier (S330).

An item selecting apparatus of an eleventh aspect of the invention is characterized in that, in the item selecting apparatus of the tenth aspects, the representative value based on the distribution of elapsed values is any one of an average value of the elapsed values; a mode value of the elapsed values; a value falling under a given order in case that the elapsed values are arranged in descending order; and a ratio of elapsed values more than a given value to the elapsed values An item selecting apparatus of a twelfth aspect of the invention is characterized in that, in the item selecting apparatus of the tenth or the eleventh aspect and in calculating, with respect to each use subject identifier, the usage characteristics information based on the distribution of elapsed values corresponding to the each use subject identifier, the usage characteristics calculating unit calculates a representative value related to the each use subject identifier in a manner that the more frequently a user related to the each use subject identifier utilizes a brand-new item, the smaller the representative value gets, and the item selecting unit calculates the freshness value with respect to each item so as to get smaller as the item is created later and performs an acquisition of the novelty index by using the correspondence rule having a characteristics that the smaller the representative value gets, the larger the degree of reducing the novelty index to an increasing of the freshness value becomes.

An item selecting apparatus of a thirteenth aspect of the invention is characterized in that, in the item selecting apparatus of any one of the first to the twelfth aspects, the usage characteristics information calculating unit calculates a degree of dispersion of the elapsed values as a constituent of the usage characteristic information (S340), in calculating the usage characteristics information based on the distribution of elapsed values corresponding to the use subject identifier, with respect to each use subject identifier.

An item selecting apparatus of a fourteenth aspect of the invention is characterized in that, in the item selecting apparatus of the thirteenth aspect, the degree of dispersion of the elapsed values is represented by any one of: a value based on the dispersion of the elapsed values; a value based on an average deviation of the elapsed values; and a value based on a difference between one value falling under a first predetermined order and another value falling under a second predetermined order, provided that the elapsed values are arranged in descending order.

An item selecting apparatus of a fifteenth aspect of the invention is characterized in that, in the item selecting apparatus of the thirteenth or the fourteenth aspect and in applying the freshness value on the correspondence rule corresponding to the usage characteristics information of each use subject identifier to obtain the novelty index, the correspondence rule used by the item selecting unit is constructed in a manner that the smaller the degree of dispersion related to the each use subject identifier gets, the greater the novelty index gets changed in relation to changing of the freshness value.

An item selecting apparatus of a sixteenth aspect of the invention is characterized in that, in the item selecting apparatus of any one of the first to the fifteenth aspects and in calculating, with respect to each use subject identifier, the usage characteristics information based on the distribution of elapsed values corresponding to the each use subject identifier, the usage characteristics information calculating unit calculates the number of elapsed values as a parameter of the usage characteristics information.

An item selecting apparatus of a seventeenth aspect of the invention is characterized in that, in the item selecting apparatus of any one of the first to the sixteenth aspects, the item selecting unit performs calculates the priority of the item with respect to each use subject identifier, based on the novelty index by using any one of: a multiplication value between the novelty index and a predetermined other index; an additional value between one value obtained by multiplying the novelty index by a first coefficient and another value obtained by multiplying the other index by a second coefficient; an additional value between one value obtained by multiplying a logarithmic value of the novelty index by a third coefficient and another value obtained by multiplying a logarithmic value of the other index by a fourth coefficient; and a multiplication value between a first power value having the novelty index as a radix and a fifth coefficient as an exponent and a second power value having the other index as a radix and a sixth coefficient as an exponent.

An item selecting apparatus of an eighteenth aspect of the invention is characterized in that, in the item selecting apparatus of any one of the first to the seventeenth aspects, the apparatus further comprises a similarity calculating unit (16) configured to calculate a degree of similarity between any two use subject identifiers, based on the usage history stored in the usage history storage unit, wherein the item selecting unit performs calculations of the priority by using a similarity index based on the degree of similarity.

An item selecting apparatus of a nineteenth aspect of the invention is characterized in that, in the item selecting apparatus of any one of the first to the eighteen aspects, the apparatus further comprises a similarity calculating unit configured to calculate a degree of similarity between any two use subject identifiers, based on the usage history stored in the usage history storage unit, wherein the item selecting unit extracts, with respect to each use subject identifier, the other use subject identifiers whose each degree of similarity to the each use subject identifier is higher than a given value or the other use subject identifiers whose number is not in excess of a predetermined number, in descending order of the degree of similarity to the each use subject identifier, extracts the item identifiers associated with the extracted use subject identifiers from the usage history stored in the usage history storage unit, and performs calculations of the priority while targeting at a group of items related to the extracted item identifiers, in calculating the priority of an item with respect to each use subject identifier.

An item selecting apparatus of a twentieth aspect of the invention is characterized in that, in the item selecting apparatus of any one of the first to the nineteenth aspects, the apparatus further comprises a user property storage unit configured to store the use subject identifier for identifying the user or the terminal unit that the user had used and property information of the user in an associated manner, and a relevance calculating unit (18) configured to calculate a relevance between any two use subject identifiers based on the user property information stored in the user property storage unit, wherein the item selecting unit performs calculations of the priority by using a relevance index based on the relevance.

An item selecting apparatus of a twenty-first aspect of the invention is characterized in that, in the item selecting apparatus of any one of the first to the twentieth aspects, the apparatus further comprises a user property storage unit configured to store the use subject identifier for identifying the user or the terminal unit that the user had used and property information of the user in an associated manner, and a relevance calculating unit configured to calculate a relevance between any two use subject identifiers based on the user property information stored in the user property storage unit, wherein the item selecting unit extracts, with respect to each use subject identifier, the other use subject identifiers whose each relevance to the each use subject identifier is higher than a given value or the other use subject identifiers whose number is not in excess of a predetermined number, in descending order of the relevance to the each use subject identifier, extracts the item identifiers associated with the extracted use subject identifiers from the usage history stored in the usage history storage unit, and performs calculations of the priority while targeting at a group of items related to the extracted item identifiers, in calculating the priority of an item with respect to each use subject identifier.

An item selecting method of a first aspect of the invention comprises the steps of: storing an item identifier of each item and item time information representing a time point of creating the item or a time point of starting providing of the item in an item property storage unit, in an associated manner; receiving usage information including a use subject identifier for identifying either a user or a terminal unit that the user has used and an item identifier for identifying an item used by the user, from another apparatus; storing a usage history which associates the use subject identifier with the item identifier contained in the usage information received by the receiving unit, in a usage history storage unit (S210); calculating an elapsed value as a difference between the item time information corresponding to the item identifier contained in the usage history stored in the usage history storage unit and a given time point (S320); calculating usage characteristics information with respect to each use subject identifier contained in the usage history stored in the usage history storage unit, based on a distribution of the elapsed values corresponding to the use subject identifier (S330); calculating, with respect to each item identifier stored in the item property storage unit, a freshness value representing a degree of freshness of the item related to the item identifier, based on the item time information corresponding to the item identifier; calculating a novelty index by using correspondence rules with different characteristics corresponding to the usage characteristics information and applying the freshness value on the correspondence rule of them corresponding to the usage characteristics information of each use subject identifier (S430, S760, S850); calculating a priority of the item each use subject identifier, based on the novelty index; and performing a selection of the item each use subject identifier, based on the priority (S440, S770, S860).

An item selecting method of a second aspect of the invention comprises the steps of: receiving usage information including at least an use subject identifier for identifying either a user or a terminal unit that the user has used and an item identifier for identifying an item used by the user, from another apparatus; storing either a usage history associating three information contained in the usage information received by the receiving unit with each other, the three information comprising the use subject identifier, the item identifier and usage time information representing a time point when the item was used, or another usage history associating two information contained in the usage information received by the receiving unit and usage time information representing a time point when the receiving unit received the usage information with each other, the two information comprising the use subject identifier and the item identifier (S210); calculating an elapsed value as a difference between the usage time information contained in the usage history stored in the usage history storage unit and a given time point (S320); calculating usage characteristics information, with respect to each use subject identifier contained in the usage history stored in the usage history storage unit, based on a distribution of the elapsed values corresponding to the use subject identifier (S330); calculating, with respect to each item identifier stored in the item property storage unit, a freshness value representing a degree of freshness of the item related to the item identifier, based on the usage time information corresponding to the item identifier; calculating a novelty index by using correspondence rules with different characteristics corresponding to the usage characteristics information and applying the freshness value on the correspondence rule of them corresponding to the usage characteristics information of each use subject identifier (S420, S750, S840); calculating a priority of the item each use subject identifier, based on the novelty index (S430, S760, S850); and performing a selection of the item each use subject identifier, based on the priority (S440, S770, S860).

An item selecting program of a first aspect of the invention allows a computer to execute the procedures of: storing an item identifier of each item and item time information representing a time point of creating the item or a time point of starting providing of the item in an item property storage unit, in an associated manner; receiving usage information including a use subject identifier for identifying either a user or a terminal unit that the user has used and an item identifier for identifying an item used by the user, from another apparatus; storing a usage history which associates the use subject identifier with the item identifier contained in the usage information received by the receiving unit, in a usage history storage unit (S210); calculating an elapsed value as a difference between the item time information corresponding to the item identifier contained in the usage history stored in the usage history storage unit and a given time point (S320); calculating usage characteristics information with respect to each use subject identifier contained in the usage history stored in the usage history storage unit, based on a distribution of the elapsed values corresponding to the use subject identifier (S330); calculating, with respect to each item identifier stored in the item property storage unit, a freshness value representing a degree of freshness of the item related to the item identifier, based on the item time information corresponding to the item identifier; calculating a novelty index by using correspondence rules with different characteristics corresponding to the usage characteristics information and applying the freshness value on the correspondence rule of them corresponding to the usage characteristics information of each use subject identifier (S420, S750, S840); calculating a priority of the item each use subject identifier, based on the novelty index (S430, S760, S850); and performing a selection of the item each use subject identifier, based on the priority (S440, S770, S860).

An item selecting program of a second aspect of the invention allows a computer to execute the procedures of: receiving usage information including at least an use subject identifier for identifying either a user or a terminal unit that the user has used and an item identifier for identifying an item used by the user, from another apparatus; storing either a usage history associating three information contained in the usage information received by the receiving unit with each other, the three information comprising the use subject identifier, the item identifier and usage time information representing a time point when the item was used, or another usage history associating two information contained in the usage information received by the receiving unit and usage time information representing a time point when the receiving unit received the usage information with each other, the two information comprising the use subject identifier and the item identifier (S210); calculating an elapsed value as a difference between the usage time information contained in the usage history stored in the usage history storage unit and a given time point (S320); calculating usage characteristics information, with respect to each use subject identifier contained in the usage history stored in the usage history storage unit, based on a distribution of the elapsed values corresponding to the use subject identifier (S330); calculating, with respect to each item identifier stored in the item property storage unit, a freshness value representing a degree of freshness of the item related to the item identifier, based on the usage time information corresponding to the item identifier; calculating a novelty index by using correspondence rules with different characteristics corresponding to the usage characteristics information and applying the freshness value on the correspondence rule of them corresponding to the usage characteristics information of each use subject identifier (S420, S750, S840); calculating a priority of the item each use subject identifier, based on the novelty index (S430, S760, S850); and performing a selection of the item each use subject identifier, based on the priority (S440, S770, S860).

Effects of the Invention

According to the present invention, the usage characteristics information is calculated each user on the basis of the usage history of the users against the items and parameters in selecting the item can be set each user by using the usage characteristics information, automatically. For even a broad range of users varying with each individual, therefore, it is possible to select information suited for each user's taste with high accuracy without urging a special manipulation to the user. Particularly, on reflecting user's taste about the novelty of items, it becomes possible to select an appropriate item with high accuracy.

For instance, for a user using items who gives weight to the freshness of items, it is possible to increase the influence of freshness of the items on the recommendation process. Conversely, for a user giving no weight to freshness of items, it is also possible to reduce the influence of freshness of the items on the recommendation process. As there is no need for a user or a service operator etc. to set parameters in the recommendation process, it is also possible to reduce user's troubles or a service operator's burden. In addition, even if the user's utilization pattern to the items changes, the parameters are updated while following the change, allowing the information to be selected with accuracy.

BRIEF DESCRIPTION OF THE DRAWINGS

FIG. 1 is a view showing a constitution of a system of the present invention as a whole.

FIG. 2 is a view showing another constitution of the system of the present invention as a whole.

FIG. 3 is a view showing a constitution of an item providing server 2 in the system in FIG. 1 or FIG. 2.

FIG. 4 is a view showing a data format in an item storage unit 22 of the item providing server 2.

FIG. 5 is a view showing a data format in a recommended information storage unit 23 of the item providing server 2.

FIGS. 10(A) and 10(B) are views showing data formats in an item property storage unit 10 of the information selecting apparatus 1.

FIG. 11 is a view showing a data format of a usage history storage unit 11 of the information selecting apparatus 1.

FIG. 26A is a view showing a data format to be stored in a user property storage unit 17 of the information selecting apparatus 1.

FIG. 26B is a view showing a data format to be stored in the user property storage unit 17 of the information selecting apparatus 1.

EMBODIMENTS OF THE INVENTION

Embodiment 1

Figure 6:
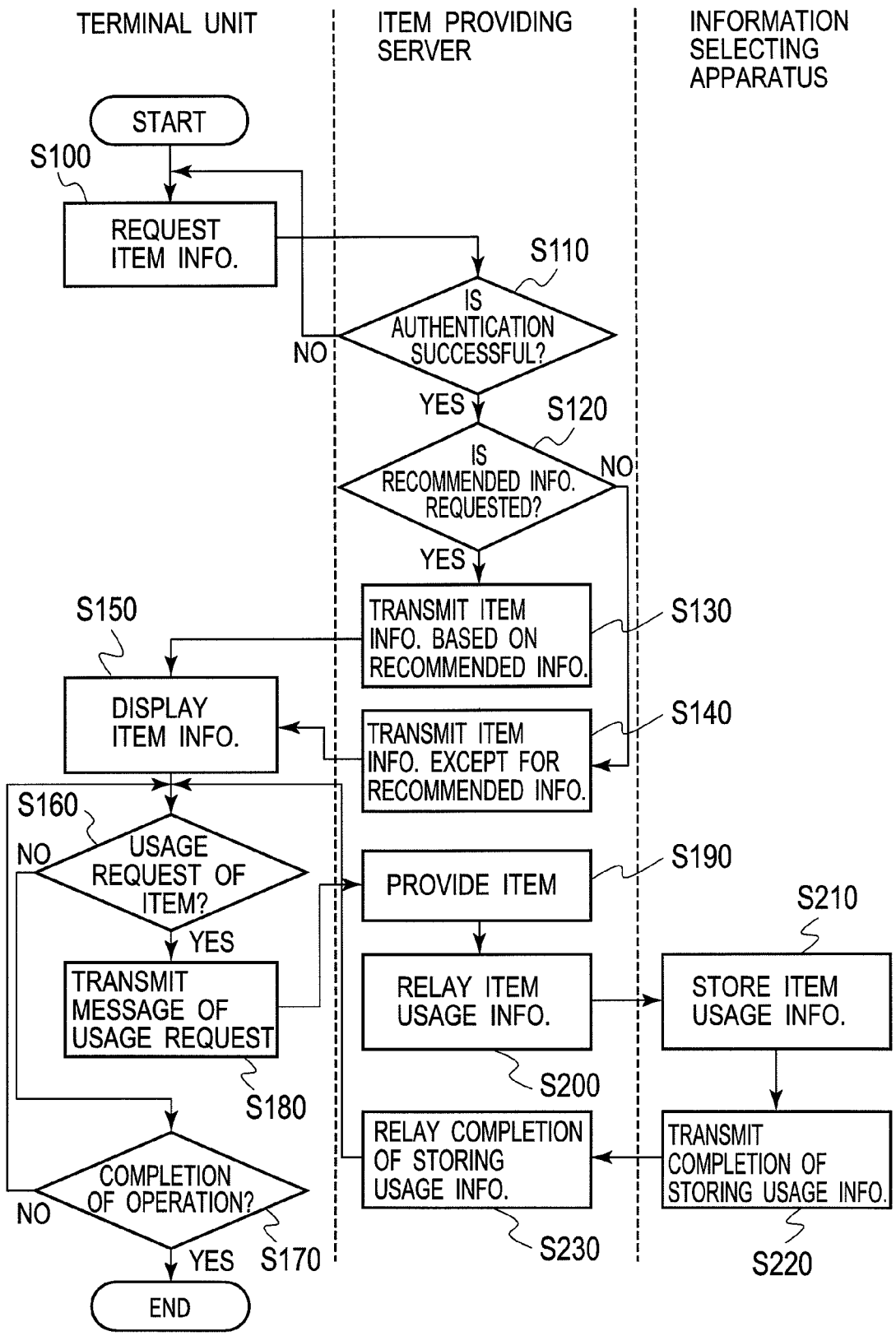
FIG. 6 is a flow chart explaining the whole operation of the system in FIG. 1 or FIG. 2.

The constitution of a whole system of the embodiment 1 is shown in FIG. 1. An information selecting apparatus 1, an item providing server 2 and one or more terminal units 3 (3a~3n) are connected with each other through a network 4. Alternatively, as shown in FIG. 2, the whole system can be constructed by using two networks. In FIG. 2, the information selecting apparatus 1 and the item providing server 2 are connected with each other through a network 4a, while the item providing server 2 and the terminal units 3 (3a~3n) are connected with each other through a network 4b. The network 4a is formed by e.g. LAN (Local Area Network) so that the information selecting apparatus 1 cannot be connected to the terminal units 3 directly. This embodiment will be illustrated with the whole system of FIG. 1 unless otherwise noted. Again, although the information selecting apparatus 1 and the item providing server 2 are constructed as separate units in this embodiment, these two functions may be integrated and embodied in a single apparatus.

The item providing server 2 is a unit that provides an item and information about the item in compliance with demands from the terminal units 3. Here, "item" may be formed by any of digital contents (e.g. text, audio, music, images, etc.), various articles and also information about financial products, immovable properties, persons or the likes. In this embodiment, namely, the item may be defined regardless of whether material or immaterial and also whether charge or charge-free. FIG. 3 shows the constitution of the item providing server 2. The item providing server 2 comprises an authentication unit 21, an item storage unit 22, a recommended information storage unit 23, a transmitting/receiving unit 24 and a control unit 25. Using a general computer having CPU, RAM, ROM, hard-disc drive, network interfaces and so on, the item providing server 2 can be embodied by executing a software (program) processing.

The authentication unit 21 authenticates the terminal unit 3 or a user using the terminal unit 3. The authentication unit 21 stores either user identifiers for identifying the users using the terminal units 3 uniquely or terminal identifiers for identifying the terminal units 3 uniquely and passwords, in an associated manner. In this embodiment, the users are identified by using the user identifiers. Nevertheless, an embodiment using the terminal identifiers will be similar to this embodiment. Note that the user identifier and the terminal identifier will be generically referred to as "use subject identifier" after. However, the authentication unit 21 may be eliminated. Alternatively, the authentication unit 21 may store only the use subject identifiers while eliminating storing of the passwords and an authentication process. If adopting hardly-changeable identifiers, for example, the terminal identifiers established at the time of manufacturing the terminal units 3 as the use subject identifiers, it is possible to eliminate storing of the passwords and an authentication process.

In a table format shown in FIG. 4, the item storage unit 22 stores item identifiers for identifying the items uniquely, item property information, such as "title" of the item, "creator", "category" and "description", and respective items, in an associated manner. The information "creator" contains a broad range of meanings depending on the type of an item, for example, a maker of the item, a director, a composer, a lyricist, a player, performers, etc.

The "category" means information resulting from the classification of items by a predetermined viewpoint. For instance, in case of music items, there is genre information of "rock", "jazz", "classics", "folk", etc. available to classify them. In case of movie items, there is genre information of "SF", "action", "comedy", "animation", etc. available to classify them. Alternatively, the category may be composed of classification information employing a creator's home country or region, for example, "Japan", "United States of America", "Britain", etc. Further, it may be composed of information about creating era of the item, such as "1970s", "1980s", "1990s" and so on. Or again, the information about impressions or moods (e.g. "healing", "exciting", "dramatic", etc.) may be used as "category". In the table, the column of "description" deals with the information about synopsis of an item, background of production, etc.

In addition, there may be present the same kind of multiple property terms in a single item. For instance, three categories may be related to a single item. Note that the item property information listed herein is illustrative only and not limited to the above-listed examples only. The item body comprises text or binary data as an item itself, or information representing a location where an item exists (e.g. URL: Uniform Resource Location) or the like. Note that the item body is an object to be stored only when the item is composed of a digital and also delivered to the terminal unit 3 via the network 4. When the items are material goods or the like, storing of the item body will be eliminated.

The recommended information storage unit 23 stores recommended information received from the information selecting apparatus 1. FIG. 5 shows a storage format for the recommended information. There are user identifiers, item identifiers and recommendation orders stored in an associated manner. This recommendation order designates the order of items to be recommended with respect to each user identifier. Thus, as the numerical value of the recommendation order gets smaller, the relevant item is presented to a user more preferentially. Instead of the recommendation orders, there may be alternatively stored recommendation degrees where the larger the numerical value of recommendation degree gets, the more preferentially the relevant item is presented to a user. Or again, by omitting to store the recommendation order, the recommended information stored in the recommended information storage unit 23 may be handled in the same order. The transmitting/receiving unit 24 transmits and receives data to and from the information selecting apparatus 1 and the terminal units 3 through the network 4 (or the networks 4a, 4b). The control unit 25 controls an overall operation of the item providing server 2.

The terminal unit 3 is formed by a general computer including CPU, RAM, ROM, hard-disc drive, network interfaces, etc. and also a built-in program for allowing an acquisition of the item information from the item providing server 2. A display unit 31 (not shown), such as a display, and an input device 32 (not shown) (e.g. keyboard, mouse, track ball, remote control device) for accepting user's operational commands are connected to the terminal unit 3.

Figure 7:
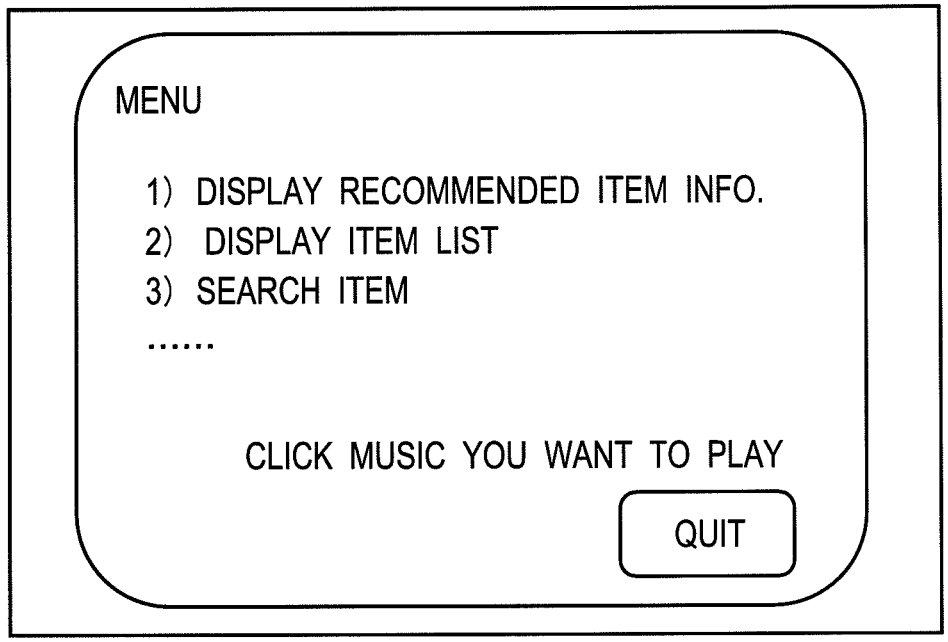
FIG. 7 is a view showing one example of an operation menu screen displayed on a display unit of a terminal unit in the system in FIG. 1 or FIG. 2.

Next, the operation of the whole system will be described with reference to a flow chart of FIG. 6. When turning on the terminal unit 3, an operating menu for acquiring the item information shown in FIG. 7 is displayed on the display unit 31. On display, the menu of "1) Display Recommended Item Info." represents an option to display the recommended information created by the information selecting apparatus 1. The menu of "2) Display Item List" represents an option to display a list of items retained by the item providing server 2, in the order of the 50-character kana (a, i, u, e, o, . . . ) or alphabetic order (A, B, C, . . . ) of, for example, item titles or creators. The menu of "3) Search Item" is an option to display an item whose title or description contains keywords inputted by a user or an item coinciding with desired categories specified by a user. In displaying the recommended information, alternatively, the system may be constructed so as to display only the recommended information that coincides with keywords or categories specified by a user. Note that the above options in the operating menu are illustrative only and therefore there are other options available for the operating menu. It should be noted that the shown options herein are to be regarded in an illustrative, and may be replaced with the other options.

First, at step S100, the terminal unit 3 transmits a message requesting the item information to the item providing server 2 when accepting a user's indication through the input unit 32. This message contains a user identifier for identifying previously-established users, a password and information (type of information on request) about an option selected through the above operating menu. In addition, if a user specifies keywords or categories to refine the recommended information on display, the message will contain such information on the specification.

Next, at step S110, the authentication unit 21 of the item providing server 2 receives the message of requesting the item information via the transmitting/receiving unit 24 and further performs an authentication process to judge whether the authentication is successful or not. If the user identifier and the password contained in the received message coincide with those stored in the authentication unit 21 in advance (Yes), then the routine goes to step S120 since the authentication is successful. In case of discordance ("No" as unsuccessful authentication), the server informs the terminal unit 3 of an authentication failure message via the transmitting/receiving unit 24, requesting to execute the process at step S110 again.

Next, at step S120, the control unit 25 of the item providing server 2 judges whether the kind of requested information contained in the message of requesting the item information is a request for recommended information or not. If the recommended information is requested (Yes), then the routine goes to step S130. If any information other than the recommended information is requested (No), the routine goes to step S140.

At step S130, the control unit 25 of the item providing server 2 creates a list of the item information based on the recommended information and transmits the list to the terminal unit 3 through the transmitting/receiving unit 24. This list includes the item identifier, the item property information and the information about recommendation order. Specifically, the control unit 23 carries out the following operations of: extracting the recommended information, which has a user identifier corresponding to the use identifier subjected to an authentication at step S110, from the data stored in the recommended information storage unit 23; reading out the item property information corresponding to the item identifier of the extracted recommended information with reference to the item storage unit 22; creating a list of recommended items together with the recommendation order; and transmitting the list finally.

When a user specifies a specific category to request the recommended information, there is provided recommended information which includes a user identifier corresponding to the use identifier subjected to the authentication at step S110 and also corresponds to an item with a category corresponding to the designated category, with reference to the recommended information storage unit 23 and the item storage unit 22. Alternatively, when a user specifies a keyword to request the recommended information, there is provided recommended information which includes a user identifier corresponding to the use identifier subjected to the authentication at step S110 and also corresponds to an item where the designated keyword is present in the item property information, such as "title", "creator" and "description", with reference to the recommended information storage unit 23 and the item storage unit 22.

At step S140, the control unit 25 of the item providing server 2 creates a list of the item information based on information except for the recommended information and transmits the list to the terminal unit 3 through the transmitting/receiving unit 24. This list includes the item identifier and the item property information. For instance, if the option of "2) Display Item List" in the operation menu of FIG. 7 is selected, then the control unit creates a tabulated list of item titles or creators in the order of the 50-character kana (a, i, u, e, o, . . . ) or alphabetic order (A, B, C, . . . ) with reference to the item storage unit 22 and successively transmits this list. Note that such a tabulated list, which can be previously created and stored in the item storage unit, may be read out and transmitted at step S140. If the option of "3) Search Item" in the operation menu of FIG. 7 is selected and a search criterion, such as a keyword, is included in the message of requesting the item information, the control unit 25 creates and transmits the list of items corresponding to the search criterion at step S140.

Figure 8:
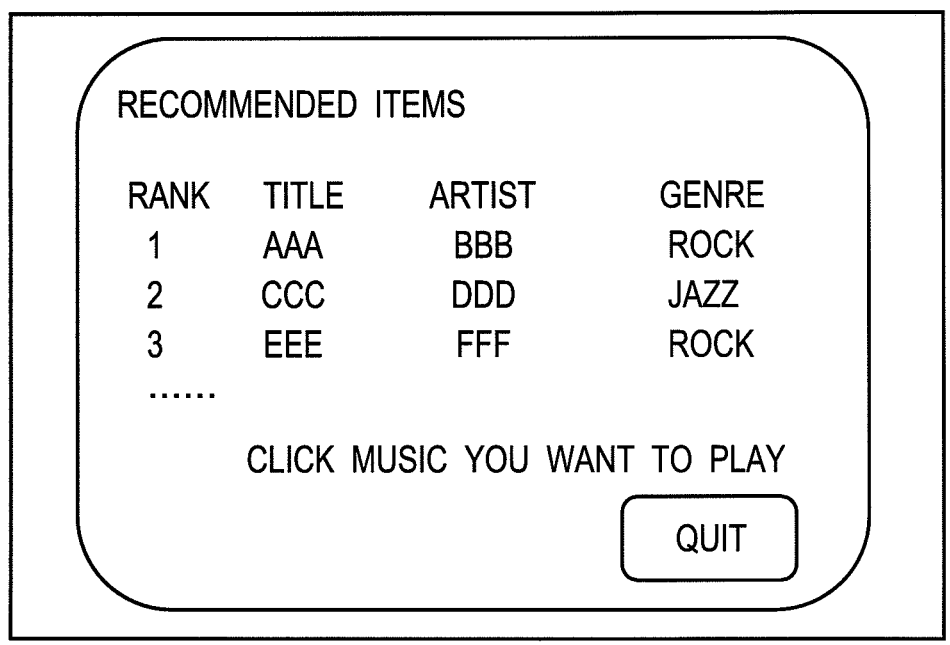
FIG. 8 is a view showing one example of a recommended item information screen displayed on the display unit of the terminal unit in the system in FIG. 1 or FIG. 2.

At step S150, the terminal unit 3 receives the item information transmitted at step S130 or S140 and displays the same information on the display unit 31. FIG. 8 shows one example of the display format of recommended item information transmitted at step S130. In the example of FIG. 8, the recommended item consists of music and there are displayed songs' names (titles), artists' names (creators) and genres (category) as the item property information combined with the rank order on recommendation.

Looking at a screen of the display unit 31, if it contains an item that a user wants to use, the user manipulates the input unit 31 and further clicks a display area of the item. For instance, if the item consists of music, the user will click a song that the user wants to play, with a mouse or the like for designation. Further, a "Quit" button to quit the operation is displayed on the screen. In a modification, there may be further displayed one button of "view display" to display item information other than the recommended information and another button of "search criteria designation" to display items falling under a designated keyword so that the system can fall in with an indication from a user and perform a processing corresponding to the indication, although their buttons are not displayed on the screen in the example of FIG. 8. In connection, although the item identifier included in the received item information is not displayed on the display unit 31, the item identifiers corresponding to respective items on the screen are stored and managed by the terminal unit 3.

At step S160, the terminal unit 3 judges whether the use request of item has been inputted through the input unit 32 by a user or not. This use request of item(s) contains a variety of requirements, for example, reproducing of items, preview of items, purchase of items, displaying of detailed information about items, registering of evaluation information (evaluated values) about items and so on. If the use request of item has been inputted (Yes), then the routine goes to step S180. If not so (No), the routine goes to step S170. At step S170, the terminal unit 3 judges whether an indication of completing the operation has been inputted through the input unit 32 by the user or not. If the indication of completing the operation has been inputted (Yes), it is executed to complete the process. If not so (No), the routine returns to step S160 to repeat the process.

At step S180, the terminal unit 3 transmits a message indicative of the use request of item to the item providing server 2. This message contains the user identifier of a user using the terminal unit 3 and the item identifier of an item designated by the user. Again, the message may include the usage time information indicative of sent date and time of the use request etc. Depending on the type of use request, additionally, necessary parameters (evaluation information etc.) can be included in the massage.

At step S190, when the transmitting/receiving unit 24 of the item providing server 2 receives the use request message of an item from the terminal unit 3, the control unit 25 of the item providing server 2 executes a process of providing a user using the terminal unit 3 with the item. For instance, if the item is formed by digital contents, the control unit reads out an item body corresponding to the item identifier included in the use request message, from the item storage unit 22 and successively transmits the item body to the terminal unit 3 through the transmitting/receiving unit 24. Otherwise, if the item is formed by material goods, the control unit executes a delivery process of sending information about delivery request to a delivery company's system. In addition, the control unit may execute a billing process as occasion demands.

At step S200, the transmitting/receiving unit 24 of the item providing server 2 transmits and relays the use request message of the item received from the terminal unit 3 to the information selecting apparatus 1. Next, at step S210, the information selecting apparatus 1 receives the use request message of the item to store the item usage information. This process will be described later. At next step S220, the information selecting apparatus 1 transmits a message indicative of a completion of storing the item usage information to the item providing server 2.

Next, at step S230, the control unit 25 of the item providing server 2 receives the message of the completion of storing the item usage information through the transmitting/receiving unit 23 and successively transmits the message to the terminal unit 3. On receipt of the message, the terminal unit 3 repeats the process from step S160. That's how the whole system does operate when a user utilizes an item.

Figure 9:
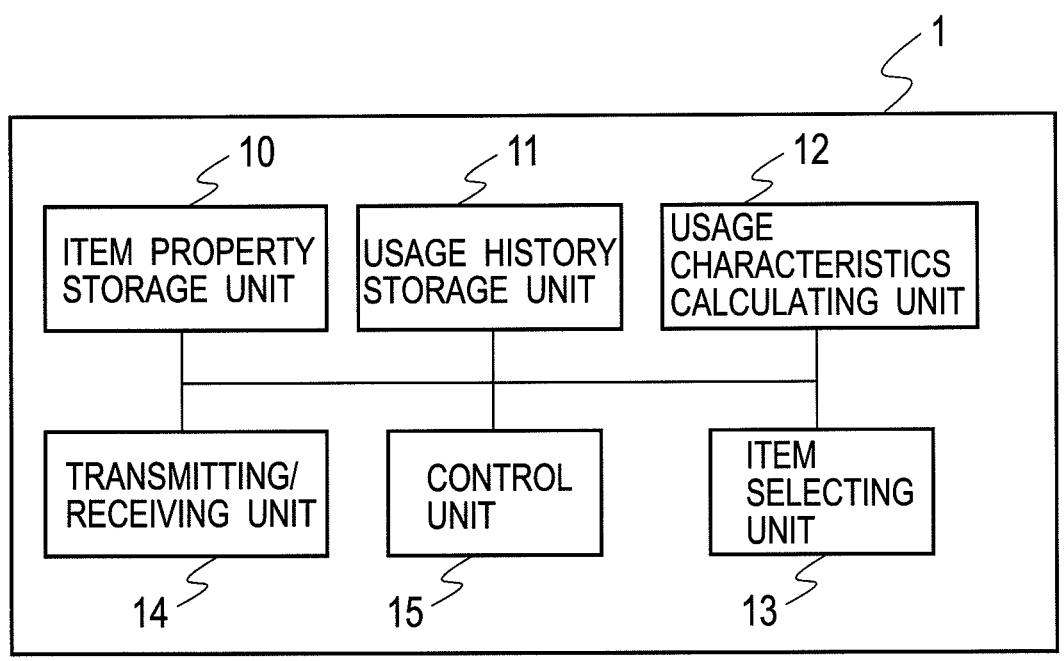
FIG. 9 is a view showing a constitution of an information selecting apparatus 1 of an embodiment 1 of the present invention.

The constitution of the information selecting apparatus 1 is shown in FIG. 9. The apparatus comprises an item property unit 10, a usage history storage unit 11, a usage characteristics calculating unit 12, an item selecting unit 13, a transmitting/receiving unit 14 and a control unit 15. Using a general computer having a CPU, a RAM, a ROM, a hard-disc drive, network interfaces and so on, the information selecting apparatus 1 may be embodied by executing a software (program) processing. Alternatively, the information selecting apparatus 1 may be formed by a plurality of computers. For instance, in view of load sharing, a distributed processing may be carried out by using a plurality of computers executing the operations of respective units of the information selecting apparatus 1. Alternatively, the distributed processing can be carried out by an arrangement where a certain computer executes the operation of part of the units forming the information selecting apparatus 1, while another computer(s) executes the operations of the other units of the apparatus.

Data storage formats in the item property storage unit 10 are shown in FIG. 10. The first storage format is in the form of a table shown in FIG. 10(A) and includes item identifiers and "item time information" in an associated manner. Here, the wording "item time information" designates either a time when the item was created or a time when the item providing server 2 started to provide the item. In this embodiment, a specific date, such as "January 1$^{st}$ 2010" is employed as a unit of time. However, there may be employed another unit, for example, time/date up to the second of e.g. "2010-1-1 10:15:20", time/date up to the millisecond or the like. Moreover, there may be employed other information, for example, "Jan. 2010" on monthly base, "1Q 2010" on quarterly basis, "2010" on year basis or "2000s" on rougher basis than year basis.

The second storage format is a table format shown in FIG. 10(B) and includes the item identifiers, the item time information and "item property information" in an associated manner. This "item property information" is similar to the item property information in the item storage unit 22 of the item providing server 2 and comprises "title" of an item, "creator", "category", "description" and so on. In connection, "item time information" may be treated as one of the item property information. If the usage characteristics information instead of "item time information" is calculated in the usage characteristics calculating unit 12, the item property storage unit 10 may be omitted, as described later.

The transmitting/receiving unit 14 transmits and receives data to and from the item providing server 2 through the network 4 (or the network 4a). The control unit 15 controls the whole operations of the information selecting apparatus 1. At step S210 in the previously-mentioned flowchart of FIG. 6, the control unit 15 of the information selecting apparatus 1 receives the use request message of the item through the transmitting/receiving unit 14. As described before, this message includes the user identifier of a user using the terminal unit 3 and the item identifier of an item designated by the user.

The control unit 15 allows the usage history storage unit 11 to store a usage history associating the user identifier, the item identifier and the usage time information with each other in the form of a table shown in FIG. 11. In FIG. 11, the user identifier and the item identifier are contained in the received use request message of the item. If the use request message of the item contains the usage time information, then it is taken out and stored as the usage time information. While, if the use request message does not contain the usage time information, the control unit stores, as the usage time information picked, a time when the information selecting apparatus 1 has received the use request message, by a clock built in the control unit 15. In this embodiment, time/date up to the second, such as "2010-1-1 10:15:20", is employed as one format of the usage time information. Otherwise, there may be employed a variety of forms, for example, time/date to the millisecond, date to the day, monthly basis, year basis, etc. In connection, assuming that the use request message contains an evaluated value of a user against the item (i.e. numeric value representing the degree of like/dislike, for example, like=3; no preference=2; dislike=1), the usage history storage unit 11 can store the user identifier, the item identifier, the usage time information and the evaluated value, in an associated manner with each other.

Next, the operation to allow the information selecting apparatus 1 to create the recommendation information and allow the item providing server 2 to receive it will be described in summary, with reference to a flow chart of FIG. 12. The process is initiated since the control unit 15 of the information selecting apparatus 1 supplies the usage characteristics calculating unit 12 with an indication of starting the operation at a predetermined timing. Various conditions are available for the predetermined timing. For instance, the process may be initiated at regular intervals (e.g. each 24 hours, etc.) or every predetermined number of times of receiving the use request message (usage information). Alternatively, the process may be initiated at variable time intervals, for example, every 3 hours from Monday to Friday, every 6 hours on Saturday and every 12 hours on Sunday. Further, the time interval may be varied depending on the season, for example, at short time intervals on summer and long time intervals on winter.

First, at step S260, the usage characteristics calculating unit 12 calculates the usage characteristics information each user. Next, at step S270, the item selecting unit 13 creates the recommendation information by using the usage characteristics information calculated at step S260. This recommended information comprises the user identifier, the item identifier and the recommendation order arranged in an associated manner, as similar to the data format described about the recommended information storage unit 23 of the item providing server 2. Then, at step S280, the control unit 15 transmits the recommended information created at step S270 to the item providing server 2 through the transmitting/receiving unit 14. At next step S290, the control unit 23 of the item providing server 2 receives the recommended information through the transmitting/receiving unit 24 and allows the recommended information storage unit 23 to store it in the format shown in FIG. 5. In connection, if the recommended information has been already stored in the recommended information storage unit 23, the received recommended information may be stored after eliminating the old recommended information. Alternatively, by storing the recommended information together with a storing time/date as version information, the recommended information in multiple versions may be simultaneously stored in the storage unit Next, a first method in the above calculation of the usage characteristics information at step 260 will be described with reference to the flow chart of FIG. 13. First, at step S300, the usage characteristics calculating unit 12 extracts data meeting a given condition out of the usage history stored in the usage history storage unit 11 and reads out the user identifier, the item identifier and the usage time information of the data. For instance, a condition of "all data being stored" can be used as the given condition. Alternatively, there may be used a condition of "data whose usage time in the usage history is within a predetermined range", for example, "data whose usage time is in the past 6 months", "data that a difference between the usage time and the present time is more than 10 days and less than 30 days", etc. Besides, a condition of "data whose item identifier in the usage history is included in a given group" may be used on the assumption of preparing groups of item identifiers in advance.

Next, at step S310, the usage characteristics calculating unit 12 reads out the item time information corresponding to the item identifier included in the readout usage history at step S300, from the item property storage unit 10. Then, at step S320, the usage characteristics calculating unit 12 calculates an elapsed value with respect to each usage history read out at step S300.

According to a first method of calculating the elapsed value, it is executed to calculate a temporal difference between the usage time information in a usage history and the item time information corresponding to the item identifier of the usage history. For instance, the "difference between the usage time information and the item time information" is calculated in units of a day. More concretely, on the first line in the table of FIG. 11, the usage time information corresponding to the data "UserID-1" and "ItemID-3" is "2010/1/1 10:15:20", while the item time information corresponding to "ItemID-3" is "2009/12/31" on the third line in the table of FIG. 10. Accordingly, the difference between "2010/1/1 10:15:20" and "2009/12/31" is calculated in units of a day. Then, regarding "2009/12/31" as "2009/12/31 00:00:00", the elapse time is calculated as "one day". In this case, as the time point of creating an item or staring its provision always precedes to the time point when the item is used by a user, the elapsed value becomes more than 0. It is also noted that the smaller the difference between the time point of creating an item or staring its provision and the time point when the item is used by a user gets (the sooner the user uses a brand-new item), the smaller the elapsed value becomes. To the contrary, the calculation of an elapsed value may be constructed in a manner that it gets larger as the time lag between these time points gets smaller. Of course, the elapsed value may be calculated by using other temporal units, for example, hours, minutes, seconds, or the likes.

According to a second method of calculating the elapsed value, it is executed to first specify a user identifier (use subject identifier) of a certain usage history (one usage history; usage history A) and another usage history (usage history B) having the same user identifier and also temporally-adjacent to (neighboring) the one usage history and secondly calculate a temporal difference between the usage time information of the usage history A and the usage time information of the usage history B. In the table, for instance, there are stored three usage histories (on $1^{st}$ line, $2^{nd}$ line and $4^{th}$ line) in connection with "UserID-1". Consequently, by calculating a temporal difference between the usage time information of "2010/1/1 10:15:20" on the $1^{st}$ line and the usage time information of "2010/1/2 15:20:30" on the $2^{nd}$ line in units of day, "1 day" is established as the elapsed value in relation to the usage history on the $1^{st}$ line. Similarly, "3 days" is established as the elapsed value in relation to the usage history on the $2^{nd}$ line, by calculating a temporal difference between the usage time information of "2010/1/2 15:20:30" on the $2^{nd}$ line and the usage time information of "2010/1/5 16:30:40" on the $4^{th}$ line in units of day. The elapsed value in relation to the usage history on the $4^{th}$ line remains in a condition of "not available" until a new usage history is stored.

In case of adopting this method, the number of elapsed values of a certain user becomes less than the number of usage histories of the same user by one. Of course, the elapsed value may be calculated by using other temporal units, for example, hours, minutes, seconds, or the likes. According to this second calculating method, the more frequently a user uses the item in short cycles, the smaller the elapsed value becomes. There is a tendency that the elapsed value of a user, who is always checking a releasing of a brand-new item and also apt to use a desired item as soon as it has been released, becomes smaller in comparison with that of the other user doing nothing like that. In case of employing second calculating method, additionally, it is possible to calculate the elapsed value even if the item property storage unit 10 does not store the item time information or the item property storage unit 10 is eliminated from the apparatus.

Next, at step S330, the usage characteristics calculating unit 12 performs a statistical processing using the elapsed value calculated at step S320 each user (the user identifier, the use subject identifier) to calculate, as the usage characteristics information, a representative value indicative of the tendency of elapsed values of the user's own. Here, anything can be utilized as the representative value as long as it is indicative of a difference in tendency between the elapsed values of the other user and the elapsed values of the relevant user. For instance, mean value, mode value, value placed in a given order in a numerical sequence where the elapsed values are arranged in descending order (e.g. median, minimum, maximum, and quartile), etc. are available for the representative value. Taking a situation where a certain user uses an item five times in total and respective elapsed values consist of "1", "2", "2", "3" and "10" for instance, a concrete numerical example will be illustrated below.

Then, the mean value is "3.6" [=(1+2+2+3+10)/5]. Again, as the value of "2" appears twice while the other values appear only once, the mode value becomes "2". Further, as the center value in a sequence arranging the elapsed values in ascending order is "3", the median becomes "3". In these values, minimum value is "1", while maximum value is "10". In the sequence arranging data in ascending order, a first quartile corresponding to data in the one-quarter (second) position from the smallest one becomes "2", while a third quartile corresponding to data in the three-fourth (fourth) position from the smallest one becomes "3". In addition, not only an arithmetic mean but a geometric mean or harmonic mean may be used for the mean value. Still further, the representative value may be provided by calculating a mean of respective logarithmic values [log (elapsed values)] of the elapsed values.

Although it differs from the meaning of "representative value" coming into general use in the statistical field, the ratio of the number of elapsed values more than a predetermined value to the number of all elapsed values related to a user may be handled as the representative value. Assume that in the above example the predetermined value is "5". Then, as the elapsed value more than "5" is only one value "10", "1/5=0.2" will be a representative value. Note that in this embodiment, the calculating of a representative value is established in a manner that the more frequently a user is apt to use a new item (a brand-new item putting fewer pauses since it was created), the smaller the representative value of the user becomes. Although the percentage of elapsed values more than a predetermined value is thus established as the representative value in the embodiment, the present invention is not limited to this. To the contrary, the calculating of a representative value may be established in a manner that the more frequently a user is apt to use a new item, the greater the representative value of the user becomes. For example, the percentage of elapsed values less than a predetermined value may be established as the representative value.

Next, at step S340, the usage characteristics calculating unit 12 calculates, as the usage characteristics information, a change value formed by a numerical value representing the degree of dispersion of the elapsed values calculated at step S320. Specifically, there are variance of elapsed values of a user, standard deviation, range (difference between maximum and minimum), interquartile range (difference between the third quartile point and the first quartile point), mean deviation (mean of absolute values of differences between elapsed values and their mean), variation coefficient (value obtained by dividing standard deviation by mean), value obtained by dividing mean deviation by a mean of elapsed values, etc. available for the change value. In addition, it could be said that both the range and the interquartile range are values based on a difference between a value falling under the first predetermined order and a value falling under the second predetermined order, provided that the elapsed values are arranged in ascending order.

In this embodiment, a user having a small change value tends to have a pattern in a period from the creation of an item to the usage of the item. For instance, in case of a user always using a brand-new item putting fewer pauses since it was created, this change value gets smaller. Conversely, in even a user who always uses an old item putting considerable elapsed time since it was created, this change value gets smaller. On the other hand, in case of a user using both a brand-new item and an old item, this change value gets larger.

Next, at step S350, the usage characteristics calculating unit 12 calculates, as the usage characteristics information, the number of elapsed values calculated at step S320 each user (user identifier). Instead of the number of elapsed values, the number of usage histories may be calculated each user. The usage characteristics calculating unit 12 completes the processing after executing step S350 and informs the control unit 15 of the completion of the processing.

Figures 13, 14:
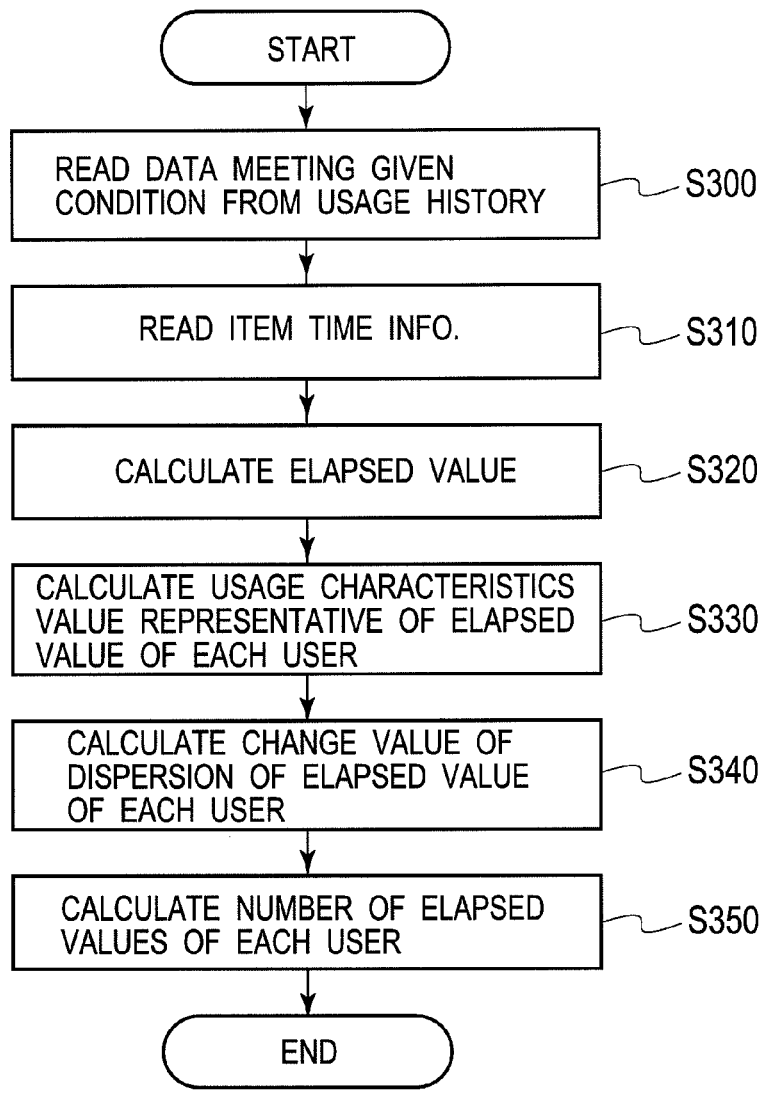
FIG. 13 is a flow chart explaining the process of calculating usage characteristics information in a usage characteristics calculating unit 12 of the information selecting apparatus 1.
FIG. 14 is a view showing a data format of the usage characteristics information in the usage characteristics calculating unit 12.

Under condition that the above processing has been completed, the usage characteristics calculating unit 12 retains data where the user identifiers, representative values, change values and the number of elapsed values are associated with each other in an inside memory, in the format shown in FIG. 14. Assume that in the following description the usage characteristics of "U" users (number: U) having respective user identifiers from "User ID-1" to "User ID-U" have been calculated.

In this embodiment, the first or second method mentioned above is used to calculate an elapsed value. Alternatively, there may be used other methods shown below.

According to a third method of calculating the elapsed value, the usage time information of the usage history is not required. In this method, at step S300, without the usage time information, but only the item identifier is read out from the usage history storage unit 11. At step S320, it is executed to calculate a temporal difference between the item time information and a given point of time, acquiring an elapsed value. For example, either a point time of calculating the elapsed value or its date can be adopted for the given point of time. Alternatively, either the oldest one of the item time information stored in the item property storage unit 10 or time/date (or date) at a certain point of time temporally-preceding the above oldest one is available for the given point of time. For instance, if the oldest item time information is "2005 4/1", the temporal information of "2005 4/1" or "2001 1/1" may be selected for the given point of time. The third method is based on a presumption that the item time information of an item contained in the usage history of a user using many brand-new items is newer than that of a user who does not use a brand-new item so much, with a high likelihood. Although there is a possibility of reduced accuracy in the usage characteristics information in comparison with the first method, the third method has a capability of calculating the usage characteristics information even if the usage time information is not stored in the usage history storage unit 11.

According to a fourth method of calculating the elapsed value, the item time information is not required. In this method, the process at step S311 (not shown) instead of step S310 is performed. That is, the routine advances from step S300 to step S311 and from step S311 to step S320 successively. At step S311, targeting the usage history read out at step S300, it is executed to calculate the distribution information of the usage time information with respect to each item identifier and successively calculate the time information related to the time of starting providing of an item (information of estimating the time of providing an item) by using the calculated distribution information. For instance, as the distribution information, it is possible to use a minimum value (the earliest time) of the usage time information with respect to each item identifier. Then, the minimum value itself or a subtracted value of a given value from the minimum value may be regarded as the estimated time information. In the example of FIG. 11, if the minimum value of the usage time information corresponding to "Item ID-3" is "2010/01/01 10:15:20" on line 1, the same time "2010/01/01 10:15:20" or a preceding time to this time by a predetermined period (e.g. 3-days ago, 10-days ago) is established as "the estimated time information". When it is experientially known that it takes "3-days" on an average from the beginning of providing an item to the first usage, the estimated time information is represented by a value obtained by subtracting "3-days" from the minimum value. Besides a determination from the minimum value, alternatively, the estimated time information may be established by a value obtained as follows. That is, it is executed to first calculate a representative value (e.g. mean, median, mode value, etc.) of the usage time information with respect to each item identifier, secondly control a given value (e.g. 3-months or 6-months) so that a value (subtracted value) obtained by subtracting the given value from the representative value does not exceed the minimum value and finally establish the so-obtained subtraction value as the estimated time information.

Then, at step S320, it is executed to acquire an elapsed value by calculating a difference between the usage time information in the usage history and the estimated time information calculated at step S311, corresponding to the item identifier of the usage history. According to the fourth method, the accuracy of the usage characteristics information may be reduced in comparison with the first method as the time point of starting the provision of the item cannot be always estimated accurately. However, the fourth method enables the usage characteristics information to be calculated even if the item time information is not stored in the item property storage unit 10 or it is eliminated.

In this embodiment, there are calculated three characteristic values of the representative value, the change value and the number of elapsed values, for the usage characteristics information. It is said that they all are values calculated on a basis of the distribution information (frequent distribution, probability distribution) of the elapsed values each user. Also, it is not always necessary to calculate all of the characteristic values and at least one of them can be calculated instead, as described later. Further, the other values (indexes), such as skewness and kurtosis, may be calculated based on the distribution information of elapsed values. Still further, by applying the distribution of elapsed values to a prescribed probabilistic distribution (i.e. probability density function), such as normal distribution, logistic distribution and gamma distribution, parameters (population parameters) of the prescribed probabilistic distribution may be adopted as the usage characteristics information.

Figure 15:
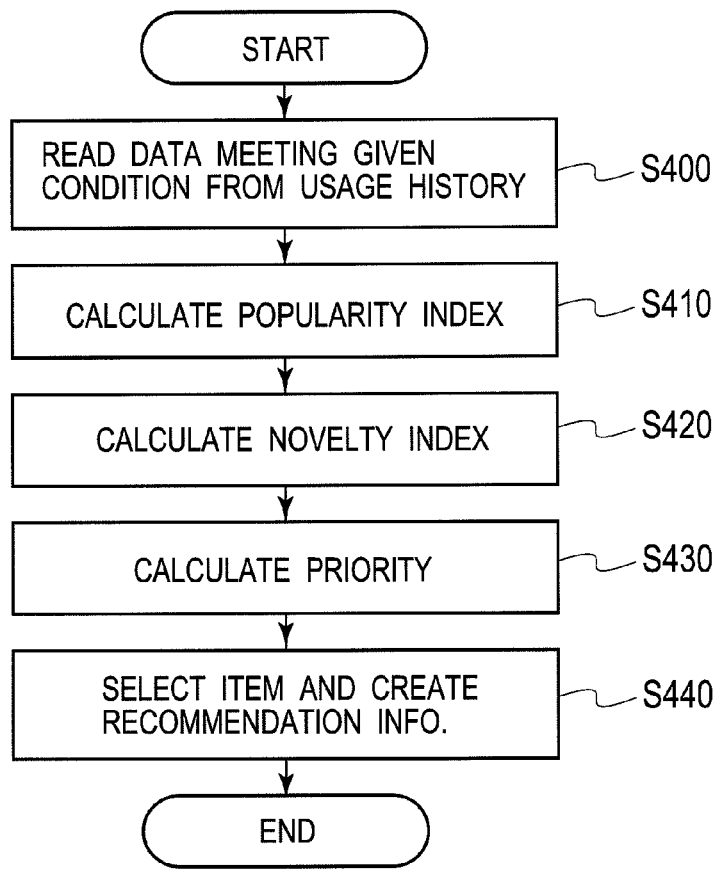
FIG. 15 is a flow chart explaining the process of creating the recommended information in the embodiment 1.

The above-mentioned recommended information creating process at step S270 will be described in detail, with reference to a flow chart of FIG. 15. First, at step S400, the item selecting unit 13 extracts data meeting a given condition out of the usage history stored in the usage history storage unit 11 and successively reads out the item identifier and the usage time information. Here, the given condition may be identical to the predetermined condition adopted at step S300 or different from that. For instance, there is a condition of "all data stored in the unit" available for the given condition. Alternatively, there may be used a condition of "data that the usage time information of the usage history is in a predetermined range", for example, conditions of "The usage time is within the last 3 months.", "A temporal difference between the usage time and the present time is equal to or more than 10 days and less than 60 days" or the like. On the assumption of preparing a group of item identifiers, additionally, there may be used a specific condition of "data whose item identifier of the usage history is contained within a predetermined group". Alternatively, on preparation of a group of user identifiers, there may be used another condition of "data whose user identifier of the usage history is contained within a predetermined group".

Next, at step S410, the item selecting unit 13 calculates a popularity index representing the degree of popularity with respect to each item identifier on a basis of the data read out at step S400. A first method of calculating the popularity index comprises a step of counting (number-counting) the number of usages with respect to each item identifier. The number of types of the item identifiers read out at step S400, which is L, is calculated and the number of usages (appearances) F[i] of the item "i" (i=1~L) is counted up. Then, the so-obtained number F[i] is regarded as the popularity index P[i] (i=1~L) of the item "i".

A second method of calculating the popularity index comprises a step of counting the number Fu[i] of users using the item i and further regarding the so-obtained number as the popularity index P[i] (i=1~L). In this method, even if a certain user uses an identical item several times, the number of usages is represented as "once".

A third method of calculating the popularity index is used for a situation where the evaluated value of a user against the item is stored in the usage history storage unit 11. Here, a value Fe[i] resulting from the adding of an evaluated value with respect to each item identifier is regarded as the popularity index P[i] (i=1~L). Alternatively, there may be added only the evaluated value that the evaluation of a user is high to some degree. For instance, when using five-level evaluated values of: much-like=5; slightly-like=4; no preference=3; slightly-dislike=2; and dislike=1, there may be carried out a processing of adding an evaluated value if it is equal to or more than "4". According to this method, it is possible to calculate the popularity index with higher accuracy than the accuracy of the first method or the second method.

A fourth method of calculating the popularity index comprises a step of using the usage time information in addition to the number of usages. Representing the number of usages of an item i in the data at step S400 by F[i] and the usage time information by Ta[j] (j=1~F[i]), the popularity index P[i] (i=1~L) of the item "i" is calculated by the following equation:

[Equation 1]

$$P[i] = \sum_{j=1}^{F[i]} f(Tc - Ta[j]) \quad (1)$$

where Tc is a given time point later than the usage time of an item (for example, time/date of a point of time of this calculation); and the function f(x) is a monotonically decreasing function characterized in that the smaller the input value gets, the larger the output value becomes. Namely, the function is formulated so as to output a larger value as a difference between the present time/date and the usage time gets smaller.

According to the equation (1), the more the number of usage times F[i] gets increased, the larger the value of the popularity index P[i] gets. However, if two items are provided with the same usage times, and the usage time of one item is relatively new, while the usage time of the other item is relatively old, then the popularity index P[i] of the item having new usage time has a larger value. Namely, the more the number of usage times and the newer the usage time are, the larger the popularity index gets.

In a fifth method of calculating the popularity index, both the evaluated value and the usage time information are used. Representing the number of usages of an item "i" in the data at step S400 by F[i], the usage time information by Ta[j] (j=1~F[i]) and the evaluated value by Ev[j] (j=1~F[i]), the popularity index P[i] (i=1~L) of the item "i" is calculated in accordance with the following equation:

[Equation 2]

$$P[i] = \sum_{j=1}^{F[i]} Ev[j] f(Tc - Ta[j]). \quad (2)$$

The function f(x) has a characteristic similar to the fourth method. Thus, by means of the function f(x), it is executed to calculate a coefficient that gets larger as the difference between the present time/date and the usage time gets smaller. Then, the calculated coefficient is multiplied by the evaluated value, and the multiplied value is added with respect to each item. This method is applied to such a situation that the evaluated value of a user against an item is stored in the usage history storage unit 11. According to this method, the more the item is evaluated highly and the newer the usage time information (time when a user made a valuation) is, the larger the popularity index gets.

It is noted here that the above description assumes that the more highly the item is evaluated, the larger the evaluated value gets. However, in case of adopting an evaluated value having the opposite characteristic, the evaluated value has only to be corrected appropriately. In addition, it may be executed to calculate a mean Em of Ev[j] (j=1~F[i]) and a mean Tm of (Tc−Ta[j]) (j=1~F[i]) and successively regard a value obtained by multiplying the former mean by the latter mean, as the popularity index P[i] (P[i]=Em×Tm). That is, the higher the mean of evaluated values and the newer the mean of usage time information are together, the larger the popularity index gets.

Next, at step S420, the item selecting unit 13 calculates a novelty index. The same unit calculates a novelty index Q[u][i] (u=1~U, i=1~M) of a user "u" against the item "i" through its calculating method will be described later, in detail. Here, as described above, "U" designates the number of users whose usage characteristics information has been calculated by the usage characteristics calculating unit 12, while "M" designates the number of items whose novelty indexes are to be calculated. Note that this calculating of the novelty indexes may be directed to all the items whose popularity indexes have been calculated or a part of items whose popularity indexes have been calculated. For instance, the calculating of novelty indexes may be directed to rated items from top to a predetermined ranking in order of popularity.

Next, at step S430, the item selecting unit 13 calculates a priority S[u][i] (u=1~U, i=1~M) of the user "u" against the item "i" with the use of the popularity index P[i] and the novelty index Q[u][i]. The priority S[u][i] is represented by a numerical value on estimation of the degree of attraction (usage motivation) with which the user "u" is attracted to the item "i". Thus, the larger the numerical value gets, the higher the possibility of catching on to user's attraction to the item gets. The priority will be calculated by the following methods.

According to a first calculating method of the priority, a product of the popularity index P[i] and the novelty index Q[u][i] is used as shown with the following equation:

[Equation 3]

$$S[u][i] = \gamma 1 \times P[i] \times Q[u][i] \quad (3)$$

where γ1 is a given coefficient.

According to a second calculating method of the priority, it is executed to add a multiplication of the popularity index P[i] by a given coefficient γ2 to a multiplication of the novelty index Q[u][i] by a given coefficient γ3, as shown with the following equation:

[Equation 4]

$$S[u][i] = \gamma 2 \times P[i] + \gamma 3 \times Q[u][i] \quad (4)$$

According to a third calculating method of the priority, it is executed to add a multiplication of a logarithmic value of the popularity index P[i] by a given coefficient γ4 to a multiplication of a logarithmic value of the novelty index Q[u][i] by a given coefficient γ5, as shown with the following equation:

[Equation 5]

$$S[u][i] = \gamma 4 \times \log(P[i]) + \gamma 5 \times \log(Q[u][i]). \quad (5)$$

According to a fourth calculating method of the priority, a product of one power value having the popularity index P[i] as a radix (base) and a constant γ6 as an exponent and another power value having the popularity index Q[u][i] as a radix (base) and a constant γ7 as an exponent is used as shown with the following equation:

[Equation 6]

$$S[u][i] = \gamma 8 \times P[i]^{\gamma 6} \times Q[u][i]^{\gamma 7} \quad (6)$$

where γ8 is a given coefficient.

According to the above-mentioned calculations, the larger the popularity index gets and the larger the novelty index gets, the more highly the priority is enhanced in value. In a modification, in contrast to this embodiment, the priority may be established so that the smaller the value gets, the more highly the priority is enhanced in value.

At next step S440, the item selecting unit 13 selects an item having a high priority S[u][i] for the user "u" and creates its recommended information. Specifically, it is executed to select an item whose priority calculated at step S430 is higher (larger) than a predetermined threshold value. In connection, a plurality of items may be selected in descending order of priority so that the number of selected items does not exceed a given number. For instance, if a user has a plurality of items with their priorities calculated and the number of such items is equal to or more than a given number, then the given number of items are selected in descending order of priority. In the meanwhile, if the number of items having the so-calculated priorities of a user does not exceed a given number, then all items having their calculated priorities may be selected. In addition, the recommending order among items is defined by giving a number staring from "1" to selected items in descending order of priority, each user. In this way, there is produced recommended information where the user identifier, the item identifier and the recommending order are arranged in an associated manner with each other, as shown in FIG. 5.

In connection, if a user designates categories of the items or keywords at step S100, the information may be employed at step S440, provided that the information selecting apparatus 1 receives a message containing the so-designated categories and keywords from the terminal unit 3 through the item providing server 1 and successively stores the received message in a memory unit inside the item selecting unit 13. Specifically, it is executed to store the user identifier and an item refining condition (e.g. categories and/or keywords) designated by the user, in the memory unit and in an associated manner. Then, at step S440, it is executed to read out an item refining condition corresponding to the user and select an item having its item property information according with the item refining condition and its priority higher (larger) than a predetermined threshold value, with reference to the item property storage unit 10. Alternatively, multiple items may be selected in descending order of priority, from the items having their item property information according with the item refining condition so that the number of selected items does not exceed a given number. In other words, the recommended information may be constructed by items meeting the item refining condition designated by a user. In this case, it is necessary to allow the item property storage unit 10 to store the data in the format shown in FIG. 10(B). On completion of the operation at step S440, the item selecting unit 13 informs the control unit 15 of completion of the process.

Next, the calculating method of the novelty index at step S420 will be described. The novelty index Q[u][i] is a numerical value representing the influence degree of "freshness" factor of the item "i" on the interest level (degree of usage motivation, degree of feeling attraction) of a user "u". The novelty index Q[u][i] is calculated based on a freshness value representing the newness of an item. First, the freshness value Nw[i] (i=1~M) of each item will be calculated in any of the following methods.

According to a first calculating method of a freshness value, the item time information is employed. Thus, it is executed to acquire the item time information Ts[i] of an item "i" from the item property storage unit 10 and successively calculate a difference between a predetermined time (e.g. the current time/date executing this calculation) and the item time information Ts[i] (i=1~M), that is, difference (Tc−Ts[i]). The freshness value Nw[i] may be represented by this difference (Nw[i]=Tc−Ts[i]). This method enables the newness of an item to be numerical value with accuracy.

According to a second calculating method of a freshness value, the usage time information of the usage history is employed. Assume that the readout usage history at step S400 contains "Fa[i]" in the number of times using an item "i". Then, the freshness value Nw[i] is calculated by the following equation:

[Equation 7]

$$Nw[i] = \frac{\sum_{i=1}^{Fa[i]}(Tc - Ta[i][j])}{Fa[i]} \quad (7)$$

That is, the freshness value is formed by a mean of differences between the predetermined time Tc and the usage time information Ta[i][j]. This method utilizes a fact that the item having a new usage time has a high probability of being created lately. Due to the presence of exceptional cases, of course, the accuracy may be reduced in comparison with the first method. Nevertheless, the freshness degree could be calculated even if the item property unit does not store or the item property unit is eliminated.

In this way, according to the embodiment, by setting the above predetermined time Tc appropriately (e.g. setting to the present time/date), the freshness value is calculated more than "0" in a manner that the newer the item gets, the smaller the freshness value gets. In a modification, the calculation of a freshness value may be established so that the newer the item becomes, the larger the freshness value gets, conversely.

Next, the novelty index Q[u][i] is calculated with the use of an output g(Nw[i]) obtained by inputting the freshness value Nw[i] into a function g(x). The function g(x) is typically constructed by a monotonically decreasing function that increases an output value as an input value gets decreased, so that the smaller the freshness value Nw[i] is, the larger the output value becomes. It may be said that the function g(x) converting the freshness value to the novelty index is a function to determine leverage of the freshness degree in the recommendation process (i.e. weight of the freshness value against the priority). In general, as a user are normally apt to ask for a brand-new item having a new creation time, it is possible to provide the user with the information about an item on user's desire by means of the processing using the typical function g(x) described above. However, it should be noted that the degree of significant concern against "newness" of the item is different for each individual user and therefore, there exists even a user who is not attracted to a new item at all and would rather favor an old item. Thus, with only executions of a processing using the function g(x) of the same characteristics for all the users, it is impossible to create the recommendation information with sufficient accuracy. Therefore, according to the present invention, the recommended information is created by not assuming the uniformity of the influence of newness in the recommendation process throughout all users but setting the influence of newness (i.e. proportion of the factor "newness" in the priority) each user appropriately.

Figure 16:
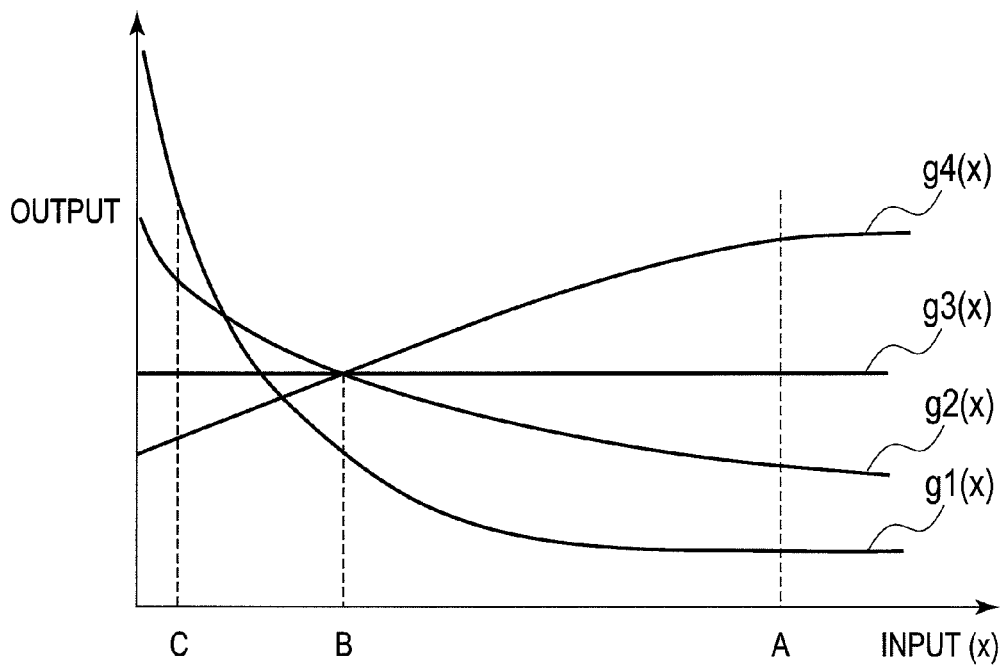
FIG. 16 is a view showing one example of the characteristics of functions to be used in calculating a novelty index in the item selecting unit 13 of the information selecting apparatus 1.

According to this embodiment, as the function g(x), "k" (in number) functions g1(x) gk(x) having difference characteristics are stored in a memory unit inside the item selecting unit 13. Assume that in the following description there are stored four functions g1(x) g4(x) as k=4, as shown in FIG. 16. Then, an appropriate function is selected from these functions with respect to each user and used to calculate the novelty index. In connection, there may be alternatively adopted an input-output correspondence rule or table describing a correspondence relationship between inputs (freshness values) and outputs (novelty indexes) etc. to calculate the novelty index from the freshness value. In short, the novelty index may be obtained from the freshness value in accordance with a prescribed correspondence rule corresponding to the usage characteristics.

In a first function-selecting method, the item selecting unit 13 selects a function with the use of a representative value in the usage characteristics information calculated by the usage characteristics calculating unit 12. In the example adopting four functions of FIG. 16, there are prepared three threshold values of θ1, θ2 and θ3. Assume that there exists a relationship of θ1<θ2<θ3 in largeness. Then, it is executed to compare a representative value R[u] of a user "u" with these threshold values to select a function.

If R[u] is smaller than θ1 (i.e. R[u]<θ1), it can be judged that this user has a high propensity for using a brand-new item putting less pause since it was created or its provision was started. Therefore, it is executed to select the function g1(x) whose attenuation amount relative to the time passage is the largest one of the functions of FIG. 16.

Next, if R[u] is equal to or more than θ1 and less than θ2 (i.e. θ1≤R[u]<θ2), it can be judged that this user has a relatively-high propensity for using a brand-new item putting less pause since it was created or its provision was started. Therefore, it is executed to select the function g2(x)

whose attenuation amount in relation to time passage is the second-largest one of the functions of FIG. 16.

Next, if R[u] is equal to or more than θ2 and less than θ3 (i.e. θ2≤R[u]<θ3), it can be judged that this user doesn't have a propensity for using a brand-new item putting less pause since it was created or its provision was started. Therefore, it is executed to select the function g3(x) outputting a fixed value irrespective of time passage in the functions of FIG. 16.

Finally, if R[u] is more than θ3 (i.e. R[u]>θ3), it can be judged that this user has a propensity for using an old item putting elapsed time since it was created or its provision was started. Therefore, it is executed to select the function g4(x) that its output value is increased with the passage of time in the functions of FIG. 16.

As for the threshold values (θ1, θ2, and θ3) used in this process, there may be used not only preset values but also values calculated by using distributional information about representative values of multiple users. Specifically, if arranging representative values of "U" (number) users in ascending order, then the threshold values are determined by using respective representative values corresponding to predetermined rank orders (predetermined cumulated frequencies) or predetermined cumulative relative frequencies. For instance, one has only to perform a process of establishing "θ1" by a representative value corresponding to the cumulative relative frequency of 20% on numeration from a smaller one, "θ2" by a representative value corresponding to the cumulative relative frequency of 70% and "θ3" by a representative value corresponding to the cumulative relative frequency of 90%, respectively.

Figure 17:
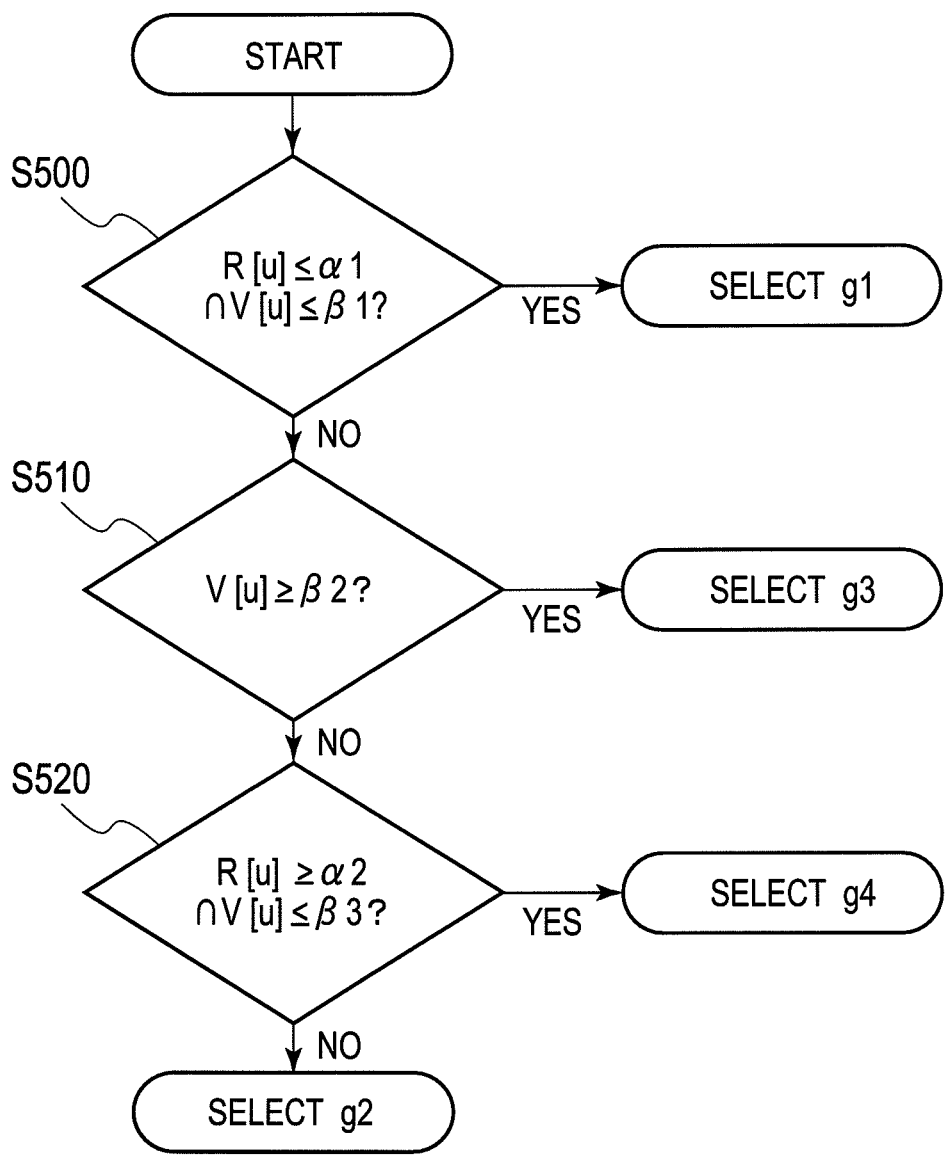
FIG. 17 is a flow chart explaining the process of selecting a function in the item selecting unit 13

The above is the first function-selecting method. According to a second function-selecting method, a function is selected by not only a representative value but a change value calculated in the usage characteristics calculating unit 12. The second function-selecting method will be described with reference to a flow chart of FIG. 17. Assume here that "R[u]" represents a representative value of a user "u", while "V[u]" represents a change value.

First, at step S500, the item selecting unit 13 judges whether R[u] is equal to or less than a given value α1 and V[u] is equal to or less than a given value β1 or not. That is, there is here presented a condition where R[u] is relatively small and V[u] is relatively small, too. When coinciding with this condition, it can be judged that a user frequently uses brand-new items each putting less pause since it was created or its provision was started and have such a tendency consistently. Accordingly, it is executed to select the function g1(x) whose attenuation amount relative to time passage is the largest one of the functions of FIG. 16. For a user provided with the so-selected function g1(x), such brand-new items are easiest to be recommended to the user. If not corresponding to this condition, then the routine goes to step S510.

Next, at step S510, the item selecting unit 13 judges whether or not V[u] is equal to or more than a given value β2. Note that there exists a relationship of β1<β2. If it coincides with this condition, it can be judged that there is no consistent tendency in the user's preference to the newness of an item since due to a relatively-large change value, sometimes the user uses a brand-new item and sometimes the user uses an old item. Accordingly, it is executed to select the function g3(x), which outputs constant level irrespective of time passage, out of the functions of FIG. 16. For a user provided with the so-selected function g3(x), the recommended information is determined irrespective of the item time information.

At next step S520, the item selecting unit 13 judges whether R[u] is equal to or more than a given value α2 and V[u] is less than a given value β3 or not. Note that there exist two relationships of α1<α2 and β3<β2. There is no special restriction in the magnitude relationship between β3 and β1. That is, there is here presented a condition where R[u] is relatively large and V[u] is relatively small. When according with this condition, it can be judged that a user frequently uses old items each putting time passage since it was created or its provision was started and have such a tendency consistently. Accordingly, it is executed to select the function g4(x) whose increasing amount relative to time passage is the largest one of the functions of FIG. 16. For a user provided with the so-selected function g4(x), such old items are easiest to be recommended to the user.

If it doesn't accord with the condition of step S520, it is executed to select the function g2(x) which is the most common one of the functions of FIG. 16 because the user has no particularly-remarkable character. In this way, owing to the adoption of a change value in addition to the representative value, it is possible to grasp the user's usage characteristics more accurately and also select a function exhibiting features suitable to the user's usage characteristics.

As for the threshold values (α1, α2, β1, β2 and β3) used in this process, there may be used not only preset values but also values calculated by using distributional information about representative values and change values of multiple users. Specifically, if arranging representative values of "U" (number) users in ascending order, then the threshold values α1 and α2 are determined by representative values corresponding to predetermined rank orders (predetermined cumulated frequencies) or predetermined cumulative relative frequencies. For instance, one has only to perform a process of establishing "α1" by a representative value corresponding to the cumulative relative frequency of 30% on numeration from a smaller one, and "α2" by a representative value corresponding to the cumulative relative frequency of 80%, respectively. Similarly, provided that change values of "U" (number) users are arranged in ascending order, the threshold values β1, β2, β3 are determined by respective change values corresponding to predetermined rank orders (predetermined cumulated frequencies) or predetermined cumulative relative frequencies. For instance, one has only to perform a process of establishing "β3" by a change value corresponding to the cumulative relative frequency of 20% on numeration from a smaller one, "β1" by a change value corresponding to the cumulative relative frequency of 30% and "β2" by a change value corresponding to the cumulative relative frequency of 80%, respectively. There is no restriction in the magnitude relationship between "β1" and "β3".

Figure 18:
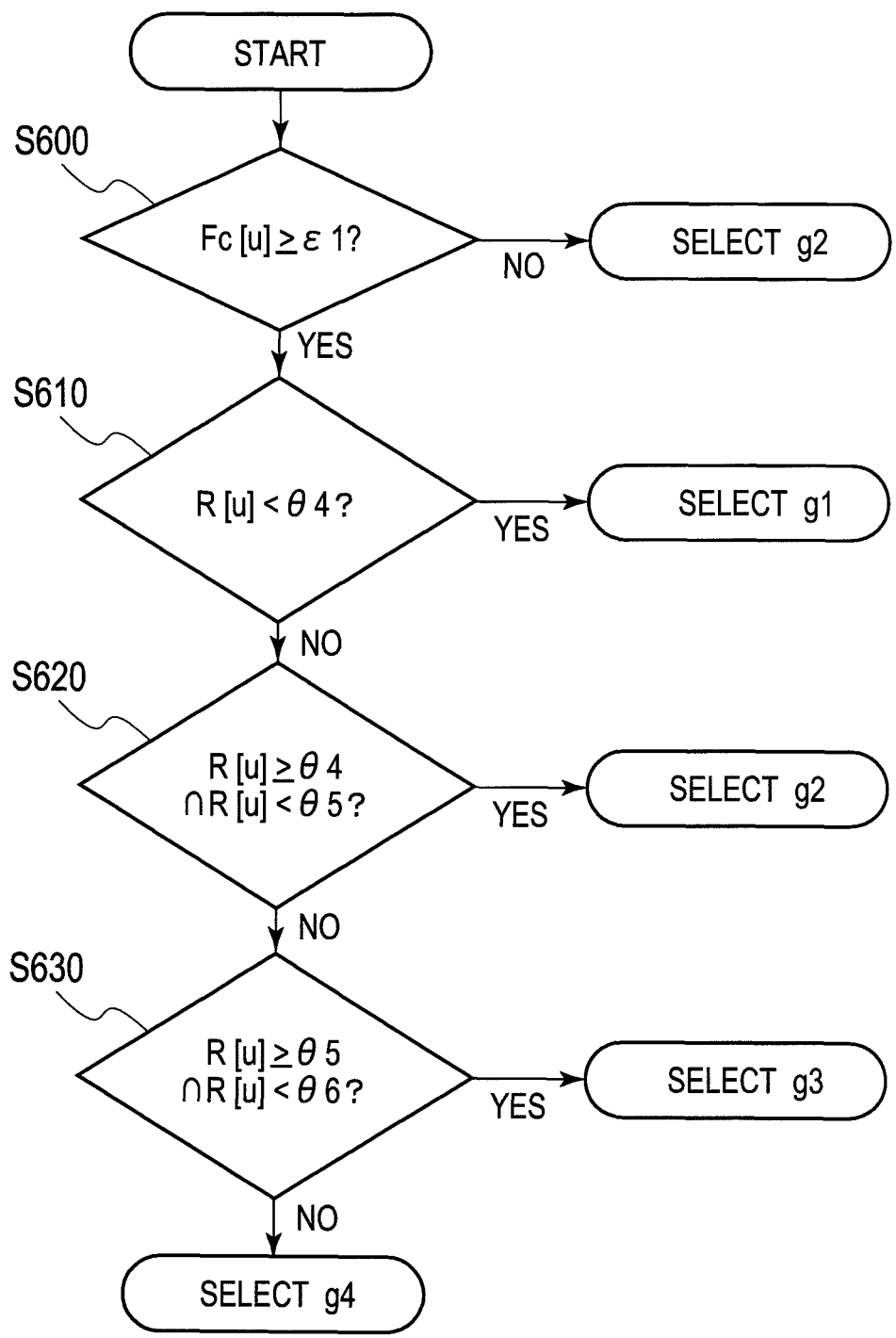
FIG. 18 is a flow chart explaining the process of selecting a function in the item selecting unit 13

According to a third function-selecting method, a function is selected by using both the representative value R[u] and the number of elapsed values (usage histories) Fc[u] of a user. In the example having options of four functions of FIG. 16, there are prepared three threshold values θ4, θ5, and θ6 about the representative values. Note that there exists a magnitude relationship of θ4<θ5<θ6. This function-selecting method will be described with reference to a flow chart of FIG. 18.

First, at step S600, the item selecting unit 13 judges whether the number of elapsed values Fc[u] is more than a predetermined value ϵ1 or not. If according with this condition, then the routine goes to step S610. If not so, the most common function g2[x] is selected. The reason why the function g2[x] is selected is because if the number of elapsed values (usage histories) is small, there is a high likelihood that an actual usage tendency of the user is not reflected on its representative value appropriately (lower reliability of the representative value), and therefore, in many cases, the accuracy of recommendation is enhanced by using a commonly-used function rather than the other functions characterized individually.

Next, at step S610, the item selecting unit 13 judges whether R[u] is less than θ4 or not. If according with this condition, then it can be judged that this user has a high propensity for using brand-new items. Accordingly, it is executed to select the function g1(x) whose attenuation amount relative to time passage is the largest one of the functions of FIG. 16. If not corresponding to this condition, then the routine goes to step S620.

Next, at step S620, the item selecting unit 13 judges whether R[u] is more than θ4 and less than θ5 or not. If according with this condition, it can be judged that the user has a relatively-high propensity for using brand-new items. Accordingly, it is executed to select the function g2(x) whose attenuation amount relative to time passage is the second-largest one of the functions of FIG. 16.

Next, at step S630, the item selecting unit 13 judges whether R[u] is more than θ5 and less than θ6 or not. If according with this condition, it can be judged that this user doesn't have a propensity for using brand-new items. Therefore, it is executed to select the function g3(x) outputting a fixed value irrespective of time passage in the functions of FIG. 16.

In case of disaccord with this condition, in other words, if R[u] is more than θ6, it can be judged that this user has a propensity for using old items rather than new items. Therefore, it is executed to select the function g4(x) that its output value is increased with the passage of time in the functions of FIG. 16.

As for the threshold values (θ4, θ5, θ6 and ε1) used in this process, there may be used not only preset values but also values calculated by using distributional information about representative values and the number of elapsed values of multiple users. Specifically, if arranging representative values of "U" (number) users in ascending order, these threshold values are determined by representative values corresponding to predetermined rank orders (predetermined cumulated frequencies) or predetermined cumulative relative frequencies. For instance, one has only to perform a process of establishing "θ4" by a representative value corresponding to the cumulative relative frequency of 20% on numeration from a smaller one, "θ5" by a representative value corresponding to the cumulative relative frequency of 70% and "θ6" by a representative value corresponding to the cumulative relative frequency of 90%, respectively. Similarly, provided that the number of elapsed values of "U" (number) users are arranged in ascending order, the threshold value ε1 is determined by the number of elapsed values corresponding to a predetermined rank order (predetermined cumulated frequency) or a predetermined cumulative relative frequency. For instance, one has only to perform a process of establishing "ε1" by the number of elapsed values corresponding to the cumulative relative frequency of 20% on numeration from a smaller one.

The above is the third function-selecting method. In this way, by using the number of elapsed values instead of the representative value, the function can be selected with high accuracy in comparison with the first method. Although the above relates to the methods of selecting an appropriate function each user, a further method may be employed for the same purpose.

For instance, the novelty index Q[u][i] can be directly calculated by using a function that its output value is reduced as the freshness value Nw[i] gets increased and further, the smaller "R[u]" gets, the larger the reduction rate becomes (more drastically). Specifically, an exponent function containing the freshness value Nw[i] and R[u] as an exponent part can be used as shown with the following equation:

[Equation 8]

$$Q[u][i] = \lambda \exp\left\{-\frac{Nw[i]}{R[u]+\delta}\right\} \qquad (8)$$

where λ is a positive constant.

In addition, "δ" is also a constant and the exponent part is set so that its denominator becomes a positive value. Also, "R[u]" is calculated so as to be a positive value in advance. Moreover, "λ" may be changed with respect to each user so that the smaller R[u] the user does have, the larger the value of "λ" gets.

According to the equation (8), the larger the freshness value gets (the older the item becomes, the smaller the value of the novelty index Q[u][i] gets. Further, the degree of reduction in the novelty index Q[u][i] to an increase of the freshness value differs with respect to each user, so that the smaller usage characteristics value R[u] a user does have, the more drastically the novelty index Q[u][i] is reduced. Therefore, the smaller usage characteristics value R[u] a user does have, the more easily the brand-new items are incorporated into the recommended information for the user. In addition, the effect extent of a freshness value on the priority (recommendation result) is relatively great for a user with a small usage characteristics value R[u], while the effect extent of a freshness value on the priority (recommendation result) is small for a user with a large usage characteristics value R[u].

Although the above description is directed to the method of determining the characteristics of a function to be selected by a representative value, the selection of a function does not always have to require a representative value. On the premise of using only a change value in the usage characteristics information, for instance, it may be performed to select the function g3(x) of FIG. 16, which generates a constant output irrespective of inputs, if the change value is equal to or more than a given value, and otherwise select the most-common function g2(x) of FIG. 16 (which is regarded as being effective for a common user) if the change value is less than the given value. In case of using the change value only, it is possible to eliminate the calculation of a representative value and the number of elapsed values in the usage characteristics calculating unit 12. Similarly, using only the number of elapsed values in the usage characteristics information, it may be performed to select the function g3(x) of FIG. 16, which generates a constant output irrespective of inputs, if the number of elapsed values is equal to or more than a given value, and otherwise select the most-common function g2(x) of FIG. 16 if the number of elapsed values is less than the given value. In case of using the number of elapsed values only, it is possible to eliminate the calculation of a representative value and a change value in the usage characteristics calculating unit 12.

Figures 19, 20, 21, 22:
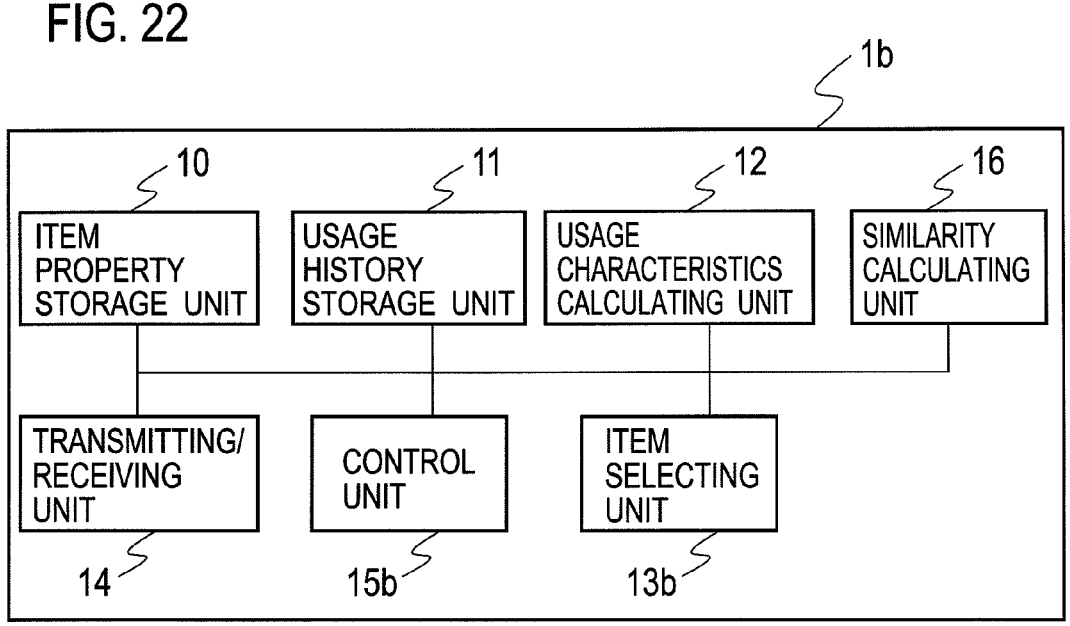
FIG. 19 is a view showing one example of a popularity index to be calculated in the item selecting unit 13.
FIG. 20 is a view showing one example of the novelty index to be calculated in the item selecting unit 13.
FIG. 21 is a view showing one example of a priority to be calculated in the item selecting unit 13.
FIG. 22 is a view showing a constitution of an information selecting apparatus 1b of an embodiment 2 of the present invention.

Concrete examples of the above-mentioned popularity index, novelty index and the priority will be described below. Assume that the top three items as a result of the process at step S410 have respective popularity indexes as shown in FIG. 19. It is also assumed that: as a result of executing the process at step S430 for four users, the function g1(x) is selected from the functions of FIG. 16, for a user 1, the function g2(x) for a user 2, the function g3(x) for a user 3 and the function g4(x) is selected for a user 4; these three items A, B, C have respective freshness values Nw[i] different from each other, which correspond to points A, B and C shown in FIG. 16, respectively; and respective values at points A, B and C of respective functions are those shown in FIG. 20. In FIG. 20, for instance, a value "0.2" at point A of "g1(x)" designates a novelty index of the user 1 about the item A. When calculating the priority by using an equality γ1=1 in the above-mentioned first method of calculating a priority (the product of popularity index by novelty index), there is obtained a result shown in FIG. 21. For instance, the priority of the user 1 about the item A has a value of "1×50×0.2=10.0" in the figure. Obviously from FIG. 21, the magnitudes of priority and the orders of items according to the priorities differ with users.

Taking one situation to recommend one item to respective users for example, this embodiment of the invention will be compared with the other method. According to the method of creating the recommended information by only the popularity index, the item A (popularity index: 50, priority: 50) will be recommended to all users. According to the method of calculating a novelty index by an identical function g(x) in common with all users and additionally calculating the priority based on the so-calculated novelty index and the popularity index, the item B (priority: 45) will be recommended to all users in case of using the function g2(x) in common with all the users. On the contrary, according to the embodiment, different items will be recommended every users, as follows: item C (priority: 51.1) for user 1; item B (priority: 45.0) for user 2; item A (priority: 50.0) for the user 3; and item A (priority: 75.0) for user 4.

In this example, the influence of a novelty index (freshness value) on the priority is remarkably large for the user 1, inducing an entirely-different result from the order of popularity indexes. Again, the influence of a novelty index (freshness value) on the priority is somewhat large for the user 2, also inducing an entirely-different result from the order of popularity indexes. On the other hand, the influence of a novelty index (freshness value) on the priority is nothing for the user 3, inducing the same result as the case of regarding the popularity as representing the priority. The influence of a novelty index (freshness value) on the priority is also large for the user 4 though the direction of the influence is different from that for the user 1. In this way, By appropriately controlling the influence of the freshness value of an item in calculating the priority each user, it is possible to create the recommendation information well-reflecting the differences in preference of respective users against "newness" of items, allowing a provision of the recommendation information of high accuracy.

Embodiment 2

The constitution of a whole system of the embodiment 2 is similar to the constitution of the embodiment 1 shown in FIGS. 1 and 2. As for the item providing server 2, the terminal units 3 (3a~3n) and the network 4 (4a, 4b), the embodiment 2 is quite identical to the embodiment 1. In the embodiment 2, an information selecting apparatus 1b corresponds to the information selecting apparatus 1 of the embodiment 1.

The constitution of the information selecting apparatus 1b of the embodiment 2 is shown in FIG. 22. It comprises the item property unit 10, the usage history storage unit 11, the usage characteristics calculating unit 12, an item selecting unit 13b, the transmitting/receiving unit 14, a control unit 15b and a similarity calculating unit 16. The constitution differs from that of the embodiment 1 in the item selecting unit 13b and the control unit 15b besides the addition of the similarity calculating unit 16. Using a general computer having CPU, RAM, ROM, hard-disc drive, network interfaces and so on, the information selecting apparatus 1b may be embodied by executing a software (program) processing.

Figure 12:
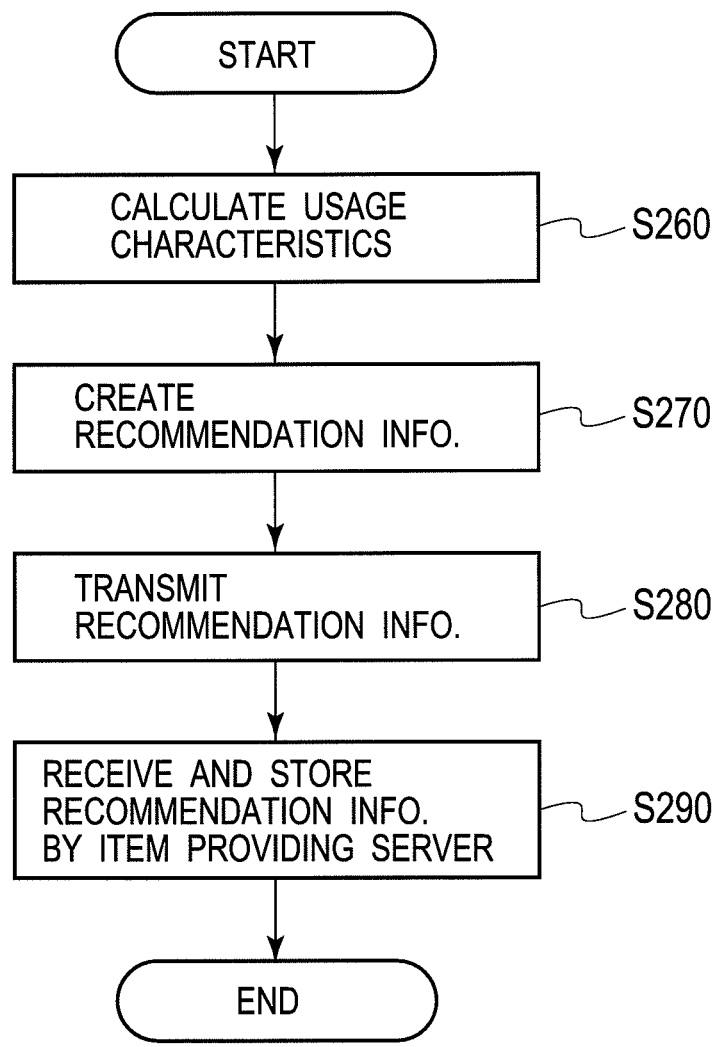
FIG. 12 is a flow chart explaining the process of transmitting recommended information from the information selecting apparatus 1 to the item providing server 2.

Also in this embodiment, a series of operations (e.g. calculation of the usage characteristics, creation of the recommended information, transmitting of the recommended information, etc.) are executed since the control unit 15b allows respective units to perform the processes similar to the flow chart of FIG. 12 at predetermined timings. In the embodiment 2, however, the recommended information creating process at step S270 is different from that of the embodiment 1, as follows.

Figure 23:
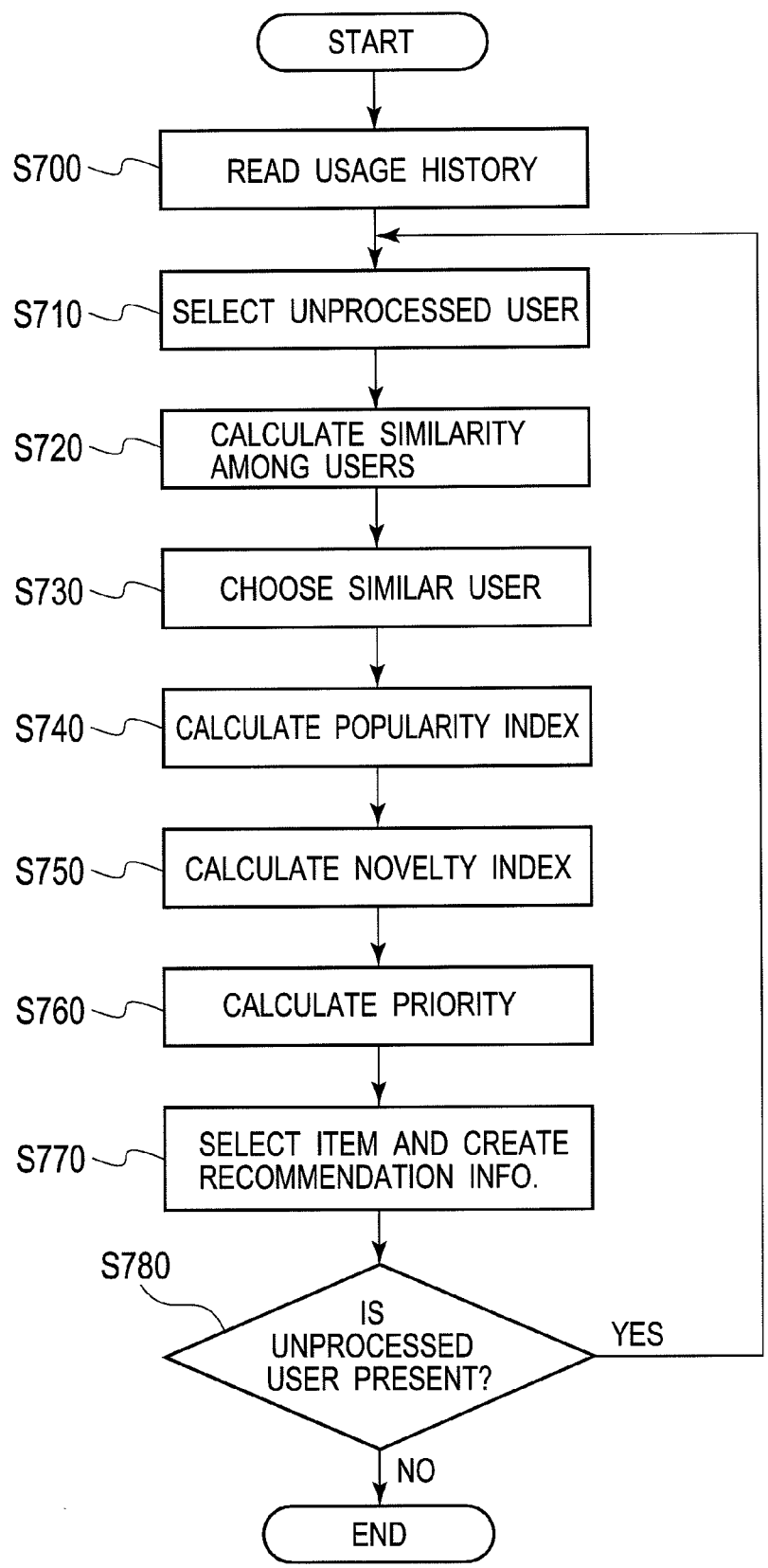
FIG. 23 is a flow chart explaining the process of creating the recommended information in the embodiment 2.

The recommended-information creating method of this embodiment will be described with reference to a flow chart of FIG. 23. First, at step S700, the similarity calculating unit 16 reads out the usage history stored in the usage history storage unit 11. Here, there may be read out all the histories stored therein or the usage histories meeting a given condition. For instance, there is a condition of "all data stored in the unit" available for the given condition. Alternatively, there may be used a condition of "data that the usage time information of the usage history is in a predetermined range", for example, "the usage time is within the last 4 months", "a temporal difference between the usage time and the present time is equal to or more than 3 days and less than 30 days" or the like.

On the assumption of preparing a group of item identifiers, additionally, there may be adopted a condition of "data that the user identifier of the usage history is contained in a given group". Alternatively, on preparation of a group of user identifiers, there may be used another condition of "data whose user identifier of the usage history is contained within a predetermined group". Hereinafter, the group of users (user identifiers) contained in the usage histories read out at this step is represented by a, the number of users (the number of different kinds of user identifiers) by Us and the number of items (the number of different kinds of items) is represented by Ms.

At next step S710, the control unit 15b selects one user which has not been processed yet (unprocessed user) out of the group σ. The unprocessed user selected here (recommendation-target user) will be referred to as "user "u"". At step S720, the similarity calculating unit 16 calculates the degree of similarity between the recommendation-target user "u" and the other user "y" (y∈σ).

In detail, assuming that "I[u]" represents a group of items that the user "u" has utilized, "I[y]" a group of items that the user "y" has utilized, "|I[u]∩I[y]|" the number of items that the users "u" and "y" have together used, and "|I[u]∪I[y]|" represents the number of kinds of items that at least one of the user "u" and user "y", then the similarity W[u][y] can be calculated, with Jaccard coefficient, by the following equation:

[Equation 9]

$$W[u][y] = \frac{|I[u] \cap I[y]|}{|I[u] \cup I[y]|}. \quad (9)$$

Alternatively, if the usage history read out at step S700 can provide the information about usage count and the information about user's evaluation against item (i.e. evaluated value), the similarity may be calculated by using cosine scale or Pearson product-moment correlation coefficient. For instance, if representing the usage count or evaluated value of the user [u] against an item [i], and the usage count or evaluated value of the user [y] against an item [i] by "E[u][i]" and "E[y][i]" respectively, the similarity W[u][y] between the user "u" and the user "y" can be calculated, with cosine scale, by the following equation:

[Equation 10]

$$W[u][y] = \frac{\sum_{i=1}^{Ms} E[u][i] \times E[y][i]}{\sqrt{\sum_{i=1}^{Ms} E[u][i]^2} \sqrt{\sum_{i=1}^{Ms} E[y][i]^2}}. \quad (10)$$

Alternatively, using Pearson product-moment correlation coefficient, the similarity W[u][y] may be calculated by the following equation:

[Equation 11]

$$W[u][y] = \frac{\sum_{i \in Ic[x][y]} (E[u][i] - Ea[u])(E[y][i] - Ea[y])}{\sqrt{\sum_{i \in Ic[u][y]} (E[u][i] - Ea[u])^2} \sqrt{\sum_{i \in Ic[u][y]} (E[y][i] - Ea[y])^2}} \quad (11)$$

where Ic[u][y] is a group of items that users "u" and "y" have used together; Ea[u] is a mean of usage count or evaluated values of user "u" related to the group Ic[u][y]; and Ea[y] is a mean of usage count or evaluated values of user "y" related to the group Ic[u][y].

In addition, Euclidean distance between E[u][i] and E[y][i] or the other types of distance may be used to calculate the similarity W[u][y].

Alternatively, the similarity can be calculated by applying a multiple classification analysis (e.g. principal component analysis, quantification method typeclass 3) to a matrix comprising usage count or evaluated values of user "u" against an item "i" "E[u][i] (u=1~ Us, i=1~Ms)", and further reducing its dimension number, through cosine scale or Euclidean distance. Besides the above-mentioned methods, one can adopt any method of producing an index as long as it is representative of the similarity between two users.

Figures 24, 25:
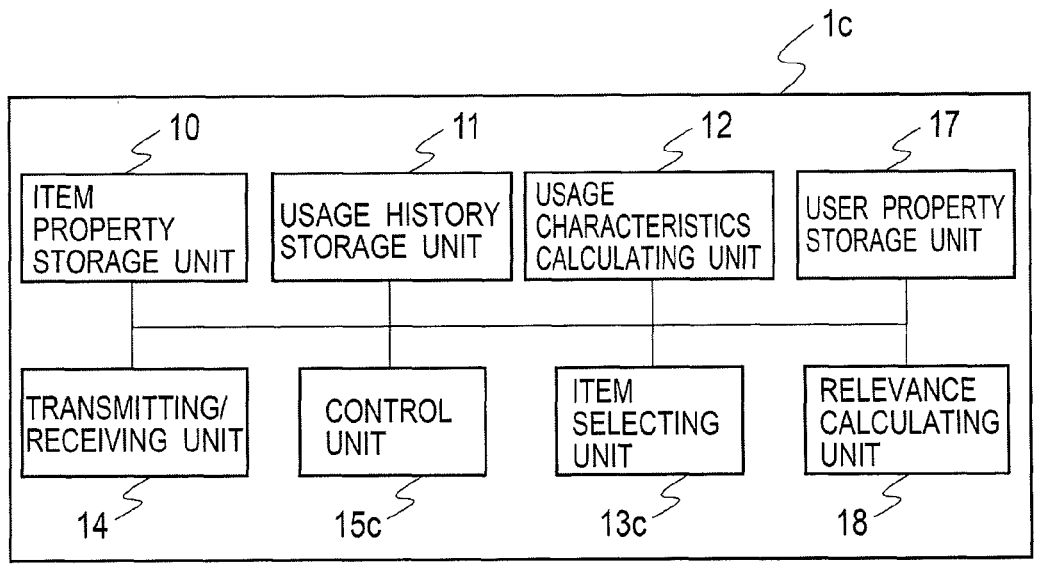
FIG. 24 is a view showing a data format to be calculated in a similarity calculating unit 16 of the information selecting apparatus 1b.
FIG. 25 is a view showing a constitution of an information selecting apparatus 1c of an embodiment 3 of the present invention.

At next step S730, the similarity calculating unit 16 picks out an "similar user" having a high similarity to the user "u". Concretely, it is executed to select the other user, whose similarity to the recommendation-target user "u" is more than a given value, from the user group a and further regard the selected user as the analogous user. Alternatively, within a predetermined number, multiple users may be selected in the descending order of similarity to the recommendation-target user, as the similar users. Assume, for instance, that the similarity is calculated so as to be a numerical value more than "0". In such a situation, if the number of users having similarity more than "0" is less than the predetermined number, then all the users having respective similarities calculated may be regarded as the similar users. On the contrary, if the similarities of users more than the predetermined number have been calculated, the predetermined number of users may be selected in the descending order of similarity. Still further, for other users whose similarities to the recommendation-target user "u" are more than the given value, users may be selected, within the predetermined number, in the descending order of similarity and further regarded as the similar users. With a format shown in FIG. 24, the similarity calculating unit 16 stores the user identifier of the recommendation-target user, the user identifiers of the selected similar users and their similarities in a memory unit inside the similarity calculating unit 16, in an associated manner. In FIG. 24, there are stored respective similar users with respect to each recommendation-target user, in the descending order of similarity. The numbers of similar users may be differentiated depending on the recommendation-target users or equalized irrespective of the recommendation-target users. The group of similar users of the user "u" calculated at this step (i.e. group of user identifiers of the similar users) is represented by "ω[u]".

Aiming an item used (or evaluated) by the similar users, at next step S740, the item selecting unit 13b calculates the popularity index of the item.

A first method of calculating the popularity index is similar to respective methods at step S410 of the embodiment 1. However, it is noted that this method differs from the embodiment 1 in the data to be processed. According to the respective methods described at step S410 of the embodiment 1, the processing is directed to the data read out at step S400. On the contrary, according to the embodiment, it may be executed to extract data, whose user identifiers of the usage history correspond to the similar user group ω[u], from the readout data at step S700 and further apply the processing similar to the respective methods of step S410 on the extracted data as a target, calculating the popularity index P[u][i]. That is, a group of items used by the users belonging to the similar user group ω[u] is specified with reference to the data read out at step S700 and the memory unit inside the similarity calculating unit 16 and the popularity index P[u][i] (i=1~Ls[u]) of an item "i" belonging to the specified group of items is calculated. Here, "Ls[u]" designates the number of items contained in the group of items that the similar user did use. Although the popularity index P[i] of the embodiment 1 is common irrespective of the user, the popularity index P[u][i] of the embodiment 2 changes with the user.

In a second method of calculating the popularity index, the similarity between users is employed. For instance, when the number of times a similar user "z" (z∈ω[u]) of the user "u" uses an item "i" is represented by F[z][i], and the similarity between the user "u" and the user "z" is represented by W[u][z], the popularity index P[u][i] is calculated by the following equation:

[Equation 12]

$$P[u][i] = \sum_{z \in \omega[u]} F[z][i] \times W[u][z]. \quad (12)$$

In this case, the more frequently a user having a high similarity uses an item, the larger the popularity index of the item becomes.

In a third method of calculating the popularity index, the similarity between users and the usage time information are employed. The popularity index is calculated by the following equation:

[Equation 13]

$$P[u][i] = \sum_{z \in \omega[u]} \sum_{k=1}^{F[z][i]} W[u][i] \times f(Tc - Ta[z][i][k]) \quad (13)$$

where $Ta[z][i][k]$ is the usage time information when the similar user "z" used the item "i" in the k-th time around; Tc is a predetermined time later than the usage time of the item (e.g. time and date at the time of executing this calculation); and the function $f(x)$ is a monotonically decreasing function where the smaller the input value is, the larger the output value gets.

According to the equation (13), the more frequently a user having a high similarity uses an item lately, the larger the popularity index $P[u][i]$ of the item becomes.

Next, at step S750, the item selecting unit 13b calculates the novelty index in a similar way to the process at step S420 of the embodiment 1. At next step S760, the item selecting unit 13b calculates the priority $S[u][i]$ (i=1~Ls[u]) of the user "u" against an item "i". In the respective methods described for step S430 of the embodiment 1, the priority $S[u][i]$ is calculated with the popularity index $P[i]$ and the novelty index $Q[u][i]$. On the contrary, in this embodiment, the processing similar to the respective methods for step S430 may be executed on replacement of the popularity index $P[i]$ of the embodiment 1 by the popularity index $P[u][i]$ for each user. According to the embodiment, not only the usage count of an item etc. described in the embodiment 1 but also the similarity between the users is utilized to calculate the novelty index.

Next, at step S770, the item selecting unit 13b selects an item having a high priority $S[u][i]$ to the user "u" and creates the recommendation information. This process is similar to that at step S440 of the embodiment 1. Then, at step S780, the control unit 15b judges whether there still remains an unprocessed user in the user group a or not. If such an unprocessed user is present (Yes), then the routine returns to step S710 to repeat the processing. If not so (No), the recommended information creating process is completed. The above is the recommended information creating process in accordance with this embodiment.

Back to step S740, additionally, if calculating the popularity index with the similarity between users as shown with the equations (12) and (13), it is not necessarily required to select an "similar user" at step S730 and thus, this step may be eliminated. For instance, with calculating of the similarity between users in the form of a numerical number more than "0" at step S720, the calculating of a popularity index at step S740 may be executed in accordance with the equation (12) or (13) while regarding a group of all users but the recommendation-target user "u" (including a user having the similarity of "0") as "ω[u]". Even in this case, the more frequently a user having a high similarity uses an item, the larger the popularity index of the item would become.

In connection, it may be executed after step S700 (and before step S710) to previously calculate respective similarities for the combinations of all users belonging to the user group σ (except combinations between the same users) and successively store the user identifiers of every pairs of users and the similarity therebetween in the memory unit of the similarity calculating unit 16. Then, it is possible to eliminate the similarity calculating process at step S720.

Although the popularity index adopting the usage count of the item etc. is calculated in this embodiment, the priority may be calculated with the aid of the novelty index and the similarity index without calculating such a popularity index. In this case, the process at step S740 is eliminated. Instead, between step S730 and step S750, while targeting items that a user "z" (z∈ω[u]) belonging to the group ω[u] of similar users has used, the similarity index $Da[u][i]$ by adding the similarity $W[u][i]$ between the user "u" and the user "y" every item "i" is calculated by the following equation:

[Equation 14]

$$Da[u][i] = \sum_{z \in \omega[u]} \Delta[z][i] \times W[u][z] \quad (14)$$

where "$\Delta[z][i]$" is a function that outputs "1" numerically when the user "z" uses an item "i" and "0" when the user does not use the same item.

Then, at step S760, the priority may be calculated by using the similarity index $Da[u][i]$ instead of the popularity index $P[u][i]$.

According to this embodiment, as the similarity is firstly calculated among the users and the recommended information is then created by using the usage history of a user having a high similarity to the recommendation-target user, it is possible to create the high-accuracy recommended information suitable to each user's taste in comparison with the embodiment 1. Again, as similar to the embodiment 1, this embodiment enables the recommended information to be produced without special input operations by a user and without the personal information about user's privacy.

Embodiment 3

The constitution of a whole system of the embodiment 3 is similar to the constitution of the embodiment 1 shown in FIGS. 1 and 2. As for the item providing server 2, the terminal units 3 (3a~3n) and the network 4 (4a, 4b), the embodiment 3 is quite identical to the embodiment 1. In the embodiment 3, an information selecting apparatus 1c corresponds to the information selecting apparatus 1 of the embodiment 1.

The constitution of the information selecting apparatus 1c of the embodiment 3 is shown in FIG. 25. It comprises the item property unit 10, the usage history storage unit 11, the usage characteristics calculating unit 12, an item selecting unit 13c, the transmitting/receiving unit 14, a control unit 15c, a user property storage unit 17 and a relevance calculating unit 18. The constitution differs from that of the embodiment 1 in the item selecting unit 13c and the control unit 15c besides the addition of the user property storage unit 17 and the relevance calculating unit 18. In this embodiment, the item property storage unit 10 stores data containing the item property information, as shown in FIG. 10(B). Using a general computer having CPU, RAM, ROM, hard-disc drive, network interfaces and so on, the information selecting apparatus 1c may be embodied by executing a software (program) processing.

The user property storage unit 16 stores the user identifiers and the user property information in the format of FIG. 26, in an associated manner. The user property information means user's unique information unexpressed on the usage history and comprises various terms, for example, user's name, date of birth, sex, region that the user lives, type of blood, admission date (i.e. time and date of starting usage of an item), hobby, category of favorite item, keywords related to favorite item, etc. Such user property information is inputted by a user through the input unit 32 when the terminal unit 3 allows the display unit 31 to display a message, which prompts the user to input the user property information, at the time of a user-registration process (admission process) etc. to be completed before starting the usage of an item. Then, the item information selecting apparatus 1 receives the property information related to the user from the terminal unit 3 via the item providing server 2 indirectly or directly and successively allows the user property storage unit 17 to store the property information.

FIG. 26A illustrates a format to store the user identifier and the property information (personal property) of the user himself (or herself), in correspondence with each other. As for specific terms (e.g. hobby, favorite category, favorite keyword, etc.), the format may contain multiple spaces in each particular term with respect to a single user.

FIG. 26B illustrates a format to store other people property information (other person property) for use in creating the recommended information, in addition to the user identifiers and the property information of the user himself (or herself). The property information of the user himself (or herself) is similar to that of FIG. 26A. The other person property means the property information about other people that the user himself (or herself) thinks that "a man (or a woman) who has the personal property may be good match with me." or "It is desirable for me that the usage information of a user having the property like this is reflected on the recommended information for me.", and also comprises various terms, for example, age group, sex, type of blood, hobby, category of favorite item, etc. As for specific terms (e.g. hobby, favorite category, favorite keyword, etc.), the format may contain multiple spaces in each particular term with respect to a single user. In the figure, parts shown with "–" designate respective terms having no data. In this way, a user does not always have to store data in all terms constituting the format.

Note that the terms of the user property information shown in FIGS. 26A and 26B are illustrative only and therefore the other term may be incorporated into the information. For instance, there may be stored a category of an item that the user dislikes, a keyword that the user dislikes and so on. Assume that in the following description the property information of Ug (number) users' is stored in the user property storage unit 17.

Also in this embodiment, a series of operations (e.g. calculation of the usage characteristics, creation of the recommended information, transmitting of the recommended information, etc.) are performed since the control unit 15c allows respective units to perform the operations similar to the flow chart of FIG. 12 at predetermined timings. Note that, in this embodiment, the following method may be adopted in the process of calculating the usage characteristics at step S260. For instance, at step S300 as part of step S260, it may be executed to create a group of item identifiers of items falling under "favorite category" and/or "favorite keyword" in the user property information with respect to each user and also read out the usage history corresponding to the group of item identifiers in calculating the usage characteristics information. That is, the usage characteristics information may be calculated by using only the usage histories corresponding to the items falling under user's "favorite category" and/or "favorite keyword".

Figure 27:
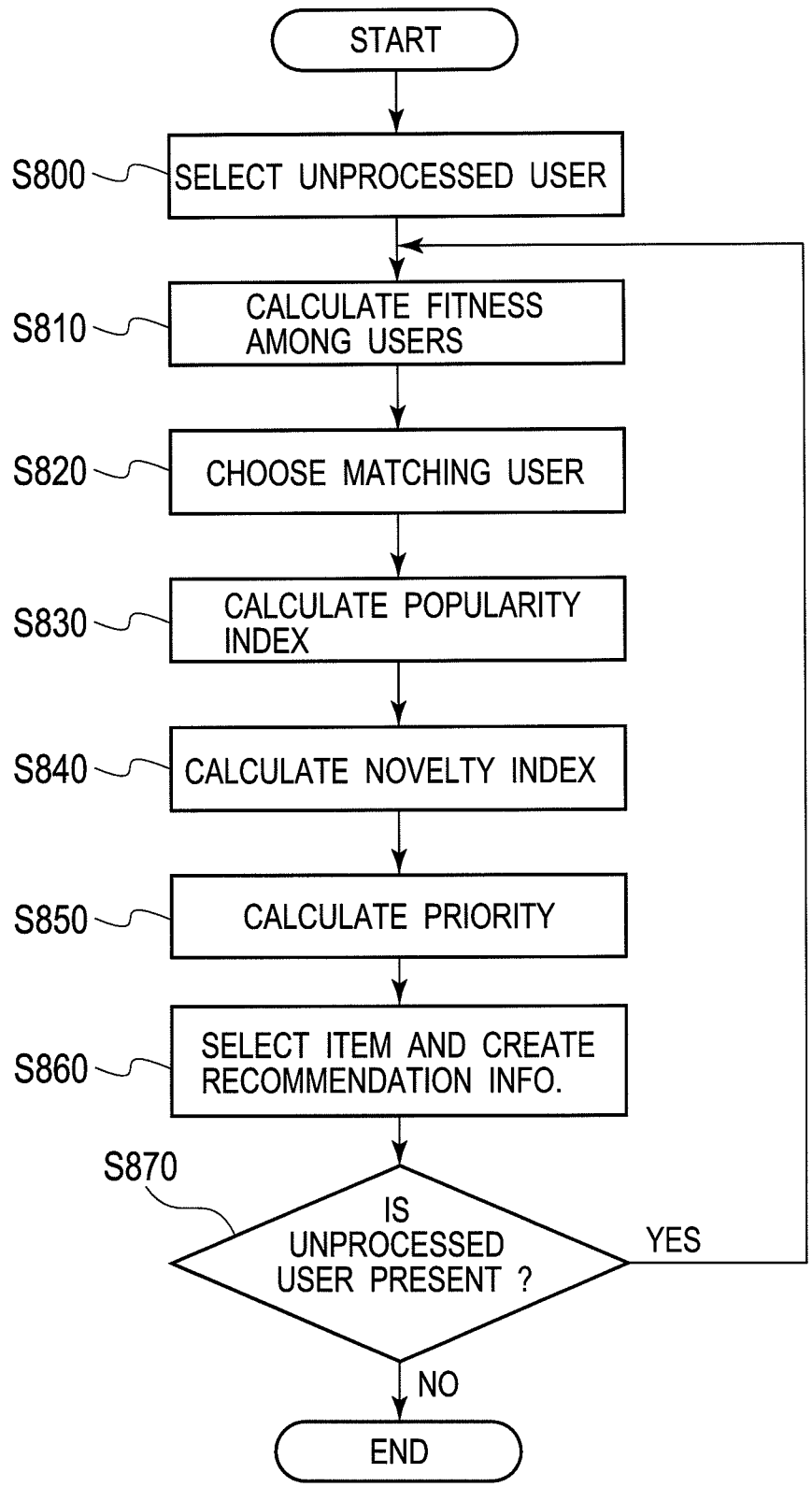
FIG. 27 is a flow chart explaining the process of creating the recommended information in the embodiment 3.

Next, the recommended information creating process corresponding to step S270 of the embodiment 1 will be described. A first method of creating the recommended information of this embodiment is shown in a flow chart of FIG. 27. First, at step S800, the control unit 15b selects one user identifier (unprocessed user) which has not been processed yet, from the user identifiers stored in the user property storage unit 17. The unprocessed user (recommendation-target user) selected here will be referred to as user "u".

At next step S810, the relevance calculating unit 18 calculates a relevance Wb[u][y] between a user "u" selected at step S800 and the other user "y" (y=1~Ug, y # u) stored in the user property storage unit 17. In this embodiment, the relevance is calculated so that the more the two users are similar to each other or the better their chemistry is, the larger the value of the relevance becomes.

A first method of calculating the relevance comprises a step of calculating the degree of relevance between the personal property of the user "u" and the personal property of the user "y". For instance, this method needs only make a count of the number of coincident terms in the personal properties of these users. For the terms of "date of birth", "admission time" etc., a process of accordance can be executed as long as a temporal difference between their respective times in the item is within a predetermined time period. For the terms of "favorite category", "favorite keyword" etc., it may be executed to previously store a rule representing the degree of accordance in the same category or keyword and subsequently calculate the relevance based on the above rule, besides regarding a situation of perfect matching as "accordance". For the term of "type of blood", their types of blood may be regarded as "accordance" when not only matching completely but also in a combination of so-called "good-matching" blood types. Although the term of "name" does not need to be adopted in calculating the relevance, the relevance between two users may be otherwise calculated by using "onomancy" based on writing or pronunciation of their names. In addition, in common with respective terms, the relevance may be expressed by using a real value representing the degree of coincidence, besides binary expression of accordance/discordance. For the term in blank, it does not need to be used for calculation of relevance or may be processed on the assumption that two users are coincident to each other. Rather than regarding as "perfect matching", alternatively, the term in blank may be handled as they are deemed to be somewhat coincident to each other.

A second method of calculating the relevance comprises a step of the other person property of the user "u" and the personal property of the user "y". Similarly to the first method, this method needs only make a count of (count) the number of coincident terms in their property information of these users. In case of adopting this method, it is necessary to store the other person property in the user property storage unit 17, as shown in FIG. 26B.

At next step S820, the relevance calculating unit 18 picks out a "fitting user" having a high relevance to the user "u". Concretely, it is executed to select the other user, whose relevance to the user "u" is more than a given value and also regard the selected user as a fitting user. Alternatively, within a predetermined number, multiple users may be selected in the descending order of relevance to the user "u", as the fitting users. Assume, for instance, that the relevance is calculated so as to be a numerical value more than "0". In such a situation, if the number of users having the relevance more than "0" is less than the predetermined number, then all the users having respective relevance calculated become respective fitting users. On the contrary, if the relevance of users exceeding the predetermined number has been calculated, it is executed to select the predetermined number of users in the descending order of relevance. From other users whose relevance to the user "u" is more than the given value each, alternatively, the predetermined number of users may be selected in the descending order of relevance and regarded as the fitting users. Then, the relevance calculating unit 16 stores the user identifier of the user "u", the user identifiers of the selected fitting users and their degrees of relevance in a memory unit inside the relevance calculating unit 18 in an associated manner. In this embodiment, the group of fitting users to the user "u" (i.e. group of user identifiers) will be represented by "$\phi[u]$".

At next step S830, targeting an item that the fitting user to the user "u" used (or evaluated), the item selecting unit 13c calculates the popularity index of the item. A first method of calculating the popularity index is similar to respective methods at step S410 of the embodiment 1. However, it is noted that this method differs from the embodiment 1 in the data to be processed. The item selecting unit 13c reads out data, of which user identifier corresponds to the user group $\phi[u]$, from the usage histories stored in the usage history storage unit 11 and further apply the similar processing to the respective methods of step S410 on the readout data as a target, calculating the popularity index P[u][i] (i=1~Lb[u]). Here, "Lb[u]" designates the number of items contained in the group of items that the fitting user to the user "u" did use. Besides all the usage histories corresponding to the group (p[u], some usage histories satisfying a given condition may be nominated as objects to be processed in a modification. For instance, there may be nominated, as the object to be processed, a usage history which corresponds to the group p[u] and of which usage time is within a predetermined range of period.

Alternatively, data as the object to be processed may be narrowed down by the user property information of the user "u". Referring to the item property storage unit 10, the usage history storage unit 11 and the user property storage unit 17 in an associated manner, the item selecting unit 13c extracts a usage history corresponding to an item having a category corresponding to e.g. the term "favorite category" in the personal property of the user "u" and also corresponding to the user group $\phi[u]$, as the object to be processed. For instance, if the "favorite category" in the personal property of the user "u" is "jazz", the object to be processed is a usage history which corresponds to an item contained in the category "jazz" and also corresponds to the user group $\phi[u]$. Or again, the term "favorite category" may be replaced with "favorite keyword" for the processing. In a similar method as above, additionally, the data to be processes may be narrowed down by using not only the user property information of the user "u" but also the user property information of users belonging to the user group $\phi[u]$.

In a second method of calculating the popularity index, the relevance between users is employed. For instance, when the number of times a fitting user "z" ($z \in \phi[u]$) uses an item "i" is represented by F[z][i], and the relevance between the user "u" and the user "z" is represented by Wb[u][z], the popularity index P[u][i] is calculated by the following equation:

[Equation 15]

$$P[u][i] = \sum_{z \in \phi[u]} F[z][i] \times \text{Wb}[u][z]. \qquad (15)$$

In this case, the more frequently a user having a high relevance uses an item, the larger the popularity index of the item becomes.

In a third method of calculating the popularity index, the relevance between users and the usage time information are employed. The popularity index is calculated by the following equation:

[Equation 16]

$$P[u][i] = \sum_{z \in \phi[u]} \sum_{k=1}^{F[z][i]} \text{Wb}[u][z] \times f(Tc - Ta[z][i][k]) \qquad (16)$$

where Ta[z][i][k] is the usage time information when the fitting user "z" used the item "i" in the k-th time around; Tc is a predetermined time later than the usage time of the item (e.g. time and date at the time of executing this calculation); and the function f(x) is a monotonically decreasing function where the smaller the input value is, the larger the output value gets.

According to the equation (16), the more frequently a user having a high relevance uses an item lately, the larger the popularity index of the item becomes.

Next, at step S840, the item selecting unit 13c calculates the novelty index in a similar way to the process at step S420 of the embodiment 1. At next step S850, the item selecting unit 13c calculates the priority S[u][i] (i=1~Lb[u]) of the user "u" against an item "i". In the respective methods described for step S430 of the embodiment 1, the priority S[u][i] is calculated with the popularity index P[i] and the novelty index Q[u][i]. On the contrary, in this embodiment, the processing similar to the respective methods for step S430 may be executed on replacement of the popularity index P[i] of the embodiment 1 by the popularity index P[u][i] for each user. According to the embodiment, not only the usage count of an item etc. described in the embodiment 1 but also the relevance between the users is utilized to calculate the novelty index.

Next, at step S860, the item selecting unit 13c selects an item having a high priority S[u][i] to the user "u" and creates the recommendation information. A first method of selecting an item is similar to the operation at step S440 of the embodiment 1. A second method of selecting an item comprises a step of selecting an item according with a given condition by the user property information. Specifically, referring to the item property storage unit 10 and the user property storage unit 17, the item selecting unit 13c selects an item which has its item property corresponding to the term "favorite category" and/or "favorite keyword" in the personal property of the user "u" and also its priority more than a predetermined threshold value. In a group of items having item properties corresponding to "favorite category" and "favorite keyword" in the personal property of the user "u", alternatively, some items may be selected in descending order of priority, in a range not in excess of a predetermined number. For instance, if the number of items belonging to the item group is more than the predetermined number, then the predetermined number of items may be selected in descending order of priority. In the meanwhile, if the number of items belonging to the item group of a user does not exceed the predetermined number, all items in the item group may be selected. In addition, the recommending order among items is defined by giving a number staring from "1" to respective items, which have been selected by the first or second method, in descending order of priority. In this way, as shown in FIG. 5, there is produced recommended information where the user identifier, the item identifier and the recommending order are arranged in an associated manner, Then, at step S870, the control unit 15c judges whether there still remains an unprocessed user in the group of users (user identifiers) stored in the user property storage unit 17 or not. If such an unprocessed user is present (Yes), then the routine returns to step S800 to repeat the processing. If not so (No), the recommended information creating process is completed.

Back to step S830, additionally, when calculating the popularity index with the relevance between the recommendation-target user and the fitting user as shown with the equations (15) and (16), it is not necessarily required to select a "fitting user" at step S820 and thus, this step may be eliminated from the flow chart. For instance, if calculating the relevance between users in the form of a numerical number more than "0" at step S810, the calculating of a popularity index at step S830 may be executed in accordance with the equation (15) or (16) while regarding a group of all users but the recommendation-target user "u" (including a user having the relevance of "0") as "ω[u]". Even in this case, the more frequently a user having a high relevance uses an item, the larger the popularity index of the item would become.

In connection, it may be executed prior to step S800 to previously calculate respective relevance for the combinations of all users stored in the user property storage unit 17 (except combinations between the same users) and successively store the user identifiers of every pairs of users and the relevance therebetween in the memory unit of the relevance calculating unit 18. Then, it is possible to eliminate the relevance calculating process at step S810.

In this embodiment, it is executed to calculate the relevance between users. Nevertheless, upon elimination of the relevance calculating unit 18, the processing using the user property information described in this embodiment may be combined with the processing of the embodiment 1. For instance, at step S440 of the embodiment 1, it may be executed to select an item whose item property coincides with the term "favorite category" and/or "favorite keyword" in the personal property of the user "u" and whose priority is high (large). In other words, the recommended information may be constructed by an item satisfying a condition about the item property information, which is designated by a user.

Although the popularity index adopting the usage count of the item etc. is calculated in this embodiment, the priority may be calculated with the aid of the novelty index and the relevance index without calculating such a popularity index. In this case, the process at step S830 is eliminated. Instead, between step S820 and step S840, while targeting items that a user "z" (z∈φ[u]) belonging to the group φ[u] of fitting users has used, the similarity index Db[u][i] by adding the relevance Wb[u][z] between the user "u" and the fitting user "z" every item "i" is calculated by the following equation:

[Equation 17]

$$Db[u][i] = \sum_{z \in \phi[u]} A[z][i] \times Wb[u][z] \quad (17)$$

where "A[z][i]" is a function that outputs "1" numerically when the user "z" uses an item "i" and "0" when the user does not use the same item.

Then, at step S850, the priority may be calculated by using the relevance index Db[u][i] instead of the popularity index P[u][i].

In addition, the priority may be calculated by using the novelty index, the relevance index and the similarity index. For instance, using the following equation:

[Equation 18]

$$Dc[u][i] = \rho 1 \times Da[u][i] + \rho 2 \times Db[u][i] \quad (18)$$

a first integrated index Dc[u][i] is calculated at first. Then, the priority can be calculated by using the first integrated index Dc[u][i] instead of the popularity index P[u][i] in the operation at step S850.

In the equation (18), the first integrated index is calculated by first multiplying the similarity index Da[u][i] and the relevance index Db[u][i] by weighting factors ρ1, ρ2 respectively and successively adding resultant multiplication values to each other. Alternatively, the first integrated index may be calculated by a product between the similarity index and the popularity index.

Similarly, the priority may be calculated by using the novelty index, the relevance index, the similarity index and the popularity index. For instance, using the following equation:

[Equation 19]

$$De[u][i] = \rho 3 \times Da[u][i] + \rho 4 \times Db[u][i] + \rho 5 \times \sum_{z \in \phi[u]} F[z][i], \quad (19)$$

a second integrated index De[u][i] is calculated at first. Then, the priority can be calculated by using the second integrated index De[u][i] instead of the popularity index P[u][i] in the operation at step S850.

In the equation (19), the second integrated index is calculated by first multiplying the similarity index Da[u][i], the relevance index Db[u][i] and the popularity index (the part of "Σ" as the sum of usage count) by weighting factors ρ3, ρ4 and ρ5 respectively and further adding resultant multiplication values to each other. Alternatively, the second integrated index may be calculated by a product among the similarity index, the relevance index and the popularity index.

According to this embodiment, as the relevance among the users is firstly calculated by using user's property and the recommended information is then created by using the usage history of a user having a high relevance, it is possible to create the high-accuracy recommended information suitable to each user's taste in comparison with the embodiment 1. Again, as similar to the embodiment 1, it is possible to provide even a user who has not used an item yet (e.g. newly-participating user) with recommendation information.

INDUSTRIAL APPLICABILITY

As obvious from the above description, the present invention allows a provision of an item selecting apparatus capable of selecting an item to be recommended to a user without great care of the user etc. and with high accuracy.

The invention claimed is:

1. An item selecting apparatus comprising:
a usage characteristics information calculator configured to:
calculate an elapsed value as a difference between a time point of item time information representing a time point of creating an item or a time point of starting providing of the item and a given time point; and
calculate usage characteristics information of a use subject with respect to item usage conditions based on a distribution of elapsed values calculated for the use subject; and
an item selector configured to:
select a correspondence rule in accordance with the usage characteristics information from a plurality of correspondence rules with different characteristics;
calculate a novelty index for each item using the correspondence rule and the item time information;
calculate a popularity index as a numerical value associated with the number of usages for each item or the number of use subjects for each item;
calculate a priority that takes a higher value as the novelty index takes a higher value and the popularity index takes a higher value; and
select a recommendation item for the use subject based on the priority;
wherein the usage characteristics information calculator and the item selector are hardware or a combination of hardware and software.

2. The item selecting apparatus according to claim 1, wherein
the usage characteristics information calculator calculates the usage characteristics information for the use subject based on elapsed values calculated as a respective difference between: a time point of item time information of each item included in a usage history representing items used by the use subject; and a given time point.

3. The item selecting apparatus according to claim 1, wherein
the item selector calculates the novelty index by applying a value, which is based on the item time information, on the correspondence rule.

4. The item selecting apparatus according to claim 1, wherein
the correspondence rule is: a function representing a relationship between a value, which is based on the item time information, and the novelty index; an input-output correspondence rule; or an input-output correspondence table.

5. The item selecting apparatus according to claim 1, wherein
the given time point is a time point of usage of an item, or a time point of reception of usage information by a receiver.

6. The item selecting apparatus according to claim 1, wherein
the item selector selects an item which belongs to a category satisfying a condition.

7. The item selecting apparatus according to claim 1, wherein
the item selector performs a selection of a recommendation item based on an evaluated value representing an evaluation level against an item.

8. The item selecting apparatus according to claim 1, wherein
the usage characteristics information calculator uses a representative value, which is based on the distribution of the elapsed values, as the usage characteristics information.

9. The item selecting apparatus according to claim 1, wherein
the usage characteristics information calculator uses a degree of dispersion of the elapsed values as the usage characteristics information.

10. The item selecting apparatus according to claim 1, wherein
the usage characteristics information calculator uses the number of elapsed values as the usage characteristics information.

11. The item selecting apparatus according to claim 1, further comprising:
a similarity calculator configured to calculate a degree of similarity between any two use subjects,
wherein the item selector performs a selection of a recommendation item by using a similarity index based on the degree of similarity, and
wherein the similarity calculator is hardware or a combination of hardware and software.

12. The item selecting apparatus according to claim 1, further comprising:
a similarity calculator configured to calculate a degree of similarity between any two use subjects,
wherein the item selector extracts other use subjects whose each degree of similarity to the use subject is higher than a given value or other use subjects whose number is not in excess of a predetermined number, in descending order of the degree of similarity to the use subject; and performs a selection of a recommendation item for the use subject from a collection of items used by extracted use subjects, and
wherein the similarity calculator is hardware or a combination of hardware and software.

13. The item selecting apparatus according to claim 1, further comprising:
a relevance calculator configured to calculate a relevance between any two use subjects,
wherein the item selector performs a selection of a recommendation item based on the relevance, and
wherein the relevance calculator is hardware or a combination of hardware and software.

14. The item selecting apparatus according to claim 1, further comprising:
a relevance calculator configured to calculate a relevance between any two use subjects,
wherein the item selector extracts other use subjects whose each relevance to the use subject is higher than a given value or other use subjects whose number is not in excess of a predetermined number, in descending order of the relevance to the use subject; and performs a selection of a recommendation item for the use subject from a collection of items used by extracted use subjects, and wherein the relevance calculator is hardware or a combination of hardware and software.

15. An item selecting method performed with a processor or a computing system for selecting an item, comprising the steps of:

calculating an elapsed value as a difference between a time point of item time information representing a time point of creating an item or a time point of starting providing of the item and a given time point;

calculating usage characteristics information of a use subject with respect to item usage conditions based on a distribution of elapsed values calculated for the use subject;

selecting a correspondence rule in accordance with the usage characteristics information from a plurality of correspondence rules with different characteristics;

calculating a novelty index for each item using the correspondence rule and the item time information;

calculating a popularity index as a numerical value associated with the number of usages for each item or the number of use subjects for each item;

calculating a priority that takes a higher value as the novelty index takes a higher value and the popularity index takes a higher value; and selecting a recommendation item for the use subject based on the priority.

16. A non-transitory computer readable medium storing an item selecting program for causing a computer to execute the steps of:

calculating an elapsed value as a difference between a time point of item time information representing a time point of creating an item or a time point of starting providing of the item and a given time point;

calculating usage characteristics information of a use subject with respect to item usage conditions based on a distribution of elapsed values calculated for the use subject;

selecting a correspondence rule in accordance with the usage characteristics information from a plurality of correspondence rules with different characteristics;

calculating a novelty index for each item using the correspondence rule and the item time information;

calculating a popularity index as a numerical value associated with the number of usages for each item or the number of use subjects for each item;

calculating a priority that takes a higher value as the novelty index takes a higher value and the popularity index takes a higher value; and selecting a recommendation item for the use subject based on the priority.

* * * * *